(12) United States Patent
Hayasaka

(10) Patent No.: US 8,372,263 B2
(45) Date of Patent: Feb. 12, 2013

(54) HYDROISOMERIZATION CATALYST, METHOD OF DEWAXING HYDROCARBON OIL, PROCESS FOR PRODUCING BASE OIL, AND PROCESS FOR PRODUCING LUBE BASE OIL

(75) Inventor: Kazuaki Hayasaka, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 483 days.

(21) Appl. No.: 12/666,422

(22) PCT Filed: Jan. 31, 2008

(86) PCT No.: PCT/JP2008/051555
§ 371 (c)(1),
(2), (4) Date: Dec. 23, 2009

(87) PCT Pub. No.: WO2009/001572
PCT Pub. Date: Dec. 31, 2008

(65) Prior Publication Data
US 2010/0181229 A1 Jul. 22, 2010

(30) Foreign Application Priority Data

Jun. 27, 2007 (JP) .................. P2007-169396

(51) Int. Cl.
*C10G 73/02* (2006.01)
(52) U.S. Cl. ............... 208/27; 502/74; 502/77; 208/28; 208/133
(58) Field of Classification Search ............. 208/27–28, 208/133; 502/74, 77
See application file for complete search history.

(56) References Cited

U.S. PATENT DOCUMENTS

| 5,075,269 | A | * | 12/1991 | Degnan et al. ................ 502/77 |
| 5,282,958 | A | | 2/1994 | Santilli et al. |
| 6,548,040 | B1 | | 4/2003 | Rouleau et al. |
| 2003/0017937 | A1 | | 1/2003 | Ihm et al. |
| 2004/0072676 | A1 | | 4/2004 | Bishop et al. |
| 2008/0083657 | A1 | * | 4/2008 | Zones et al. ................ 208/134 |

FOREIGN PATENT DOCUMENTS

| CN | 86106388 | 4/1988 |
| JP | 5-508876 | 12/1993 |
| JP | 2001-146418 | 5/2001 |
| JP | 2003-033658 | 2/2003 |
| JP | 2003-505576 | 2/2003 |

(Continued)

OTHER PUBLICATIONS

W. Huybrechts et al., "Bifunctional catalytic isomerization of decane over MTT-type aluminosilicate zeolite crystals with siliceous rim," Journal of Catalysis, vol. 239, pp. 451-459, 2006.

(Continued)

*Primary Examiner* — Brian McCaig
(74) *Attorney, Agent, or Firm* — Greenblum & Bernstein, P.L.C.

(57) ABSTRACT

A hydroisomerization catalyst according to the present invention is obtained by calcining a catalyst composite including an ion-exchanged molecular sieve or a calcined material thereof which is obtained by performing ion exchange of a molecular sieve containing an organic template in a solution containing a cation species and using water as a main solvent and at least one metal which is selected from a group consisting of metals belonging to Groups 8-10 of the Periodic Table of the Elements, molybdenum, and tungsten supported on the ion-exchanged molecular sieve or a calcined material thereof.

22 Claims, 11 Drawing Sheets

FOREIGN PATENT DOCUMENTS

| WO | 01/07538 | 2/2001 |
|---|---|---|
| WO | 2006/028884 A1 | 3/2006 |

OTHER PUBLICATIONS

International Search Report for PCT/JP2008/051555, mailed Apr. 22, 2008.

International Preliminary Report on Patentability for PCT/JP2008/051555, mailed Jan. 21, 2010.

Chinese Office Action that issued with respect to patent family member Chinese Patent Application No. 200880022130.8, dated Sep. 15, 2011.

European Search Report that issued with respect to European Patent Application No. EP 08710665.4, mailed Jun. 9, 2010.

* cited by examiner

US 8,372,263 B2

HYDROISOMERIZATION CATALYST, METHOD OF DEWAXING HYDROCARBON OIL, PROCESS FOR PRODUCING BASE OIL, AND PROCESS FOR PRODUCING LUBE BASE OIL

TECHNICAL FIELD

The present invention relates to a hydroisomerization catalyst, a hydrocarbon oil dewaxing method, a base oil manufacturing method, a lube-oil base oil manufacturing method.

BACKGROUND ART

In such a lube oil, a gas oil, and a jet fuel among petroleum products, a cold flow property is important. For this reason, it is preferable that, in a base oil used for those products, such a wax component causing a deterioration of the cold flow property as normal paraffins or slightly branched iso-paraffins completely or partially removed or transformed into components other than the wax component. Recently, since a hydrocarbon obtained by using a Fischer-Tropsch synthesizing method (hereinafter, simply referred to as an FT synthesizing method) does not contain such an environmental load material as a sulfur compound, it has attracted attention as a feedstock oil for manufacturing a lube oil or a fuel. However, such a hydrocarbon also contains a large amount of the wax component.

As a dewaxing technique for removing the wax component from the hydrocarbon oil, a method of extracting the wax component by using a solvent such as a liquefied propane or MEK has been known. However, the method has problems in that operation cost thereof is high, the method is used for limited types of feedstock oils, and production yield is limited according to the types of the feedstock oil.

On the other hand, as a method of transforming the wax component in the hydrocarbon oil into an non-wax component, a catalytic dewaxing method of isomerizing normal paraffins in the hydrocarbon oil into iso-paraffins by contacting the hydrocarbon oil to the so-called bi-functional catalyst having a hydrogenation-dehydrogenation ability and an isomerization ability in the presence of hydrogen has been proposed. In addition, as the bi-functional catalyst used for the catalytic dewaxing method, a catalyst containing a solid acid, especially a molecular sieve composed of such a zeolite, and metals belonging to Groups 8-10 or Group 6 of the Periodic Table of the Elements, particularly, a catalyst where the aforementioned metal is supported on the molecular sieve has been proposed.

Although the catalytic dewaxing method can be effectively used as a method of improving the cold flow property of the hydrocarbon oil, a normal paraffin conversion needs to be sufficiently increased in order to obtain a fraction suitable for the lube-oil base oil or the fuel base oil. However, since the catalyst used for the catalytic dewaxing method has the cracking ability of hydrocarbon as well as the isomerization ability, in a case where the hydrocarbon oil is subjected to the catalytic dewaxing process, lightening of the hydrocarbon accompanied with the increase in the normal paraffin conversion proceeds. Therefore, it is difficult to obtain a desired fraction with a good yield. In particular, in case of manufacturing a high quality lube-oil base oil requiring a high viscosity index and a low pour point, it is very difficult to obtain a desired fraction with a good economical efficiency by using the catalytic dewaxing of the hydrocarbon oil. For this reason, in this field, a synthetic base oil such as a poly alpha-olefin has been widely used.

Due to such circumstances, in a field of manufacturing the lube-oil base oil and the fuel base oil, there is a demand for a catalytic dewaxing technology capable of producing a desired iso-paraffin fraction with a good yield from the hydrocarbon oil containing the wax component.

Until now, an approach for improving an isomerization selectivity of the catalyst used for the catalytic dewaxing has been attempted. For example, in the following Patent Document 1, there is disclosed a manufacturing process of a lube oil which is dewaxed by contacting a hydrocarbon raw material having straight chain or slightly branched chain and 10 or more carbon atoms to a catalyst composed of such a molecular sieve having a medium-sized one-dimensional pore structure and a crystal size of less than about $0.5\mu$ as ZSM-22, ZSM-23, and ZSM-48 containing metal of Group VIII and the like.

Incidentally, the molecular sieve constituting the catalyst used for the catalytic dewaxing is generally manufactured by using a hydrothermal synthesis in the presence of an organic template having such as an amino group and an ammonium group in order to obtain a predetermined pore structure. Next, the synthesized molecular sieve is calcined at a temperature of about 550° C. or higher in the ambience containing a molecular oxygen to remove the contained organic template as disclosed in the final paragraph of Section 2.1. Materials of the following Non-Patent Document 1, page 453. Next, the calcined molecular sieve is typically subjected to an ammonium-type ion exchange process in an aqueous solution containing ammonium ions as disclosed in the final paragraph of Section 2.3. Catalytic Experiments of the following Non-Patent Document 1, page 453. Further, after the ion exchange, such metal components as metals belonging to Groups 8-10 of the Periodic Table of the Elements are loaded on the molecular sieve. Next, the metal component-loaded molecular sieve is subjected to a drying process and a molding process (if needed), then is charged into a reactor, and is calcined typically at a temperature of about 400° C. in the ambience containing a molecular oxygen. Next, it is subjected to a reduction treatment approximately at the same temperature by hydrogen or the like, so that it is provided with the catalyst activity as the bi-functional catalyst.

[Patent Document 1] U.S. Pat. No. 5,282,958

[Non-Patent Document 1] J. A. Martens et al., J. Catal. 239 (2006) 451

DISCLOSURE OF THE INVENTION

Problem to be Solved by the Invention

However, in the manufacturing process disclosed in Patent Document 1, the isomerization selectivity of the catalyst is not sufficient, and the cracking activity is not sufficiently suppressed. Therefore, it is difficult to obtain the desired iso-paraffin fraction suitable for the lube-oil base oil or the fuel base oil from a hydrocarbon oil including a wax component with a high yield.

The present invention has been accomplished in light of the aforementioned circumstances, and its objects are to provide a hydroisomerization catalyst having a sufficiently high isomerization activity and a sufficiently suppressed cracking activity, which can give a hydrocarbon oil suitable for a lube-oil base oil and a hydrocarbon oil suitable for a fuel base oil from a hydrocarbon oil containing normal paraffins with a high yield, to provide a hydrocarbon oil dewaxing method, to provide a base oil manufacturing method, and to provide a lube-oil base oil manufacturing method.

Means for Solving the Problems

The inventor of the present invention has studied extensively in view of the problems of the conventional technique, to find that a catalyst which is obtained by loading a specific metal on a molecular sieve that is obtained by performing an ion exchange of a hydrothermally synthesized molecular sieve in a specific condition in the state that a the molecular sieve contains an organic template and by calcining the metal-loaded molecular sieve is able to greatly increase an amount of C10 isomers in a reaction product in an isomerization reaction of a normal decane, that is, to have a high isomerization activity as well as a low cracking activity with a high level in comparison with a conventional catalyst. In addition, the inventor of the present invention has investigated based on the above-mentioned findings, to find that it is possible to obtain an iso-paraffin fraction suitable for a lube-oil base oil or a fuel base oil, particularly, an iso-paraffin fraction suitable for a high quality lube-oil base oil having a high viscosity index and a low pour point by contacting a hydrocarbon oil containing a wax component and a catalyst that is obtained by loading a specific metal on a carrier containing the aforementioned ion-exchanged molecular sieve and by calcining the metal-loaded ion-exchanged molecular sieve in the presence of hydrogen. As a result, the present invention is contrived.

Namely, the present invention provides a hydroisomerization catalyst which is obtained by calcining a catalyst composite including an ion-exchanged molecular sieve or a calcined material thereof which is obtained by ion exchange of a molecular sieve containing an organic template in a solution containing a cation species and using water as a main solvent and at least one metal which is selected from a group consisting of metals belonging to Groups 8-10 of the Periodic Table of the Elements, molybdenum, and tungsten supported on the ion-exchanged molecular sieve or the calcined material thereof. The periodic table of the elements denotes a long-form of the periodic table regulated by the International Union of Pure and Applied Chemistry (IUPAC).

The hydroisomerization catalyst according to the present invention having the aforementioned construction can function as a catalyst having a sufficiently high isomerization activity in the hydroisomerization of the normal paraffins and a sufficiently suppressed cracking activity. In addition, according to the hydroisomerization catalyst of the present invention, even in a case where the hydrocarbon oil containing the normal paraffins is subjected to the hydroisomerization in the presence of hydrogen under the condition that the normal paraffin conversion is sufficiently increased, it is possible to obtain iso-paraffins having the desired number or more of carbon atoms with a greatly high yield in comparison with a case using a conventional catalyst. Therefore, when the hydroisomerization catalyst according to the present invention is used for the catalytic dewaxing of the hydrocarbon oil containing the normal paraffins, it is possible to obtain the hydrocarbon oil suitable for a lube-oil base oil and/or the hydrocarbon oil suitable for the fuel base oil with a sufficiently high yield. In addition, with respect to the hydrocarbon oil suitable for the fuel base oil, it is possible to obtain the hydrocarbon oil very suitable for, particularly, the gas oil base oil with a high yield. With respect to the hydrocarbon oil suitable for the lube-oil base oil, it is possible to obtain the hydrocarbon oil suitable for, particularly, the lube-oil base oil having a high viscosity index and a low pour point with a high yield.

In addition, according to the hydroisomerization catalyst of the present invention, when the normal paraffins are subjected to the hydroisomerization, it is possible to provide a large amount of isomers having two or more branched chains per one molecule (multi-branched isomers). It is known that the multi-branched isomers have a property of decreasing the pour point of the base oil in comparison with single-branched isomers. Therefore, the multi-branched isomer selectivity of the hydroisomerization catalyst according to the present invention can be very effective for providing a low pour point to the lube-oil base oil or the fuel base oil manufactured by using the catalytic dewaxing method.

Incidentally, it is known that in the iso-paraffin molecules which are generated by the catalytic dewaxing of the hydrocarbon oil containing the wax component, a structure where branched chains exist in an inner position of the main chain other than a terminal position thereof further decreases the pour point of the lube-oil base oil or the fuel base oil. And, as a performance factor of the catalyst used for the catalytic dewaxing, there is proposed an index representing the branched chain position selectivity for the generated iso-paraffin molecules. For example, in a document (J. A. Martens et al., ZEOLITE, 6 (1986) 451), there is proposed a constraint index CI° that is defined as follows.

Constraint Index CI°: a molar ratio of 2-methylnonane to 5-methylnonane generated when an iso-decane yield is 5 wt % in an isomerization reaction using a normal decane as a model raw material. The smaller the constraint index CI°, the better the branched chain position selectivity for the generated iso-paraffin molecules. Therefore, such a catalyst used for the catalytic dewaxing is preferably used in the field of manufacturing the lube-oil base oil or the fuel base oil.

On the other hand, in the hydroisomerization catalyst according to the present invention, since the ion-exchanged molecular sieve constituting the catalyst is obtained by the aforementioned specific method, so that it is possible to obtain a small constraint index CI° in comparison with the conventional catalyst obtained by the same type of synthetic molecular sieve. Therefore, the branched chain position selectivity that is given to the hydroisomerization catalyst according to the present invention can be very effective for providing a low pour point to the lube-oil base oil or the fuel base oil manufactured by using the catalytic dewaxing method.

In addition, in the hydroisomerization catalyst according to the present invention, in terms of providing a high isomerization activity and a low cracking activity, it is preferable that the molecular sieve containing the organic template is a zeolite having a pore structure having a 10-membered ring or an 8-membered ring.

Further, in terms of more effectively performing a selective conversion of the normal paraffins, it is preferable that the zeolite has a one-dimensional pore structure having a 10-membered ring.

In addition, in terms of easily controlling an activity of a solid acid catalyst, it is preferable that the zeolite is at least one crystalline aluminosilicate selected from a group consisting of ZSM-22, ZSM-23, and ZSM-48.

Further, in a case where the zeolite is the aforementioned crystalline aluminosilicate, it is preferable that a molar ratio [Si]/[Al] of silicon to aluminum atoms in the crystalline aluminosilicate is in a range of 10 to 400. By using such a crystalline aluminosilicate, it is possible to obtain a high catalytic activity and a high isomerization selectivity for the normal paraffins in comparison with a case where a molar ratio deviating from the aforementioned range is used.

In addition, the present invention provides a hydroisomerization catalyst wherein the molecular sieve containing the organic template is ZSM-22, and a constraint index defined as follows is in a range of 7 to 12.

Constraint index $CI°$: a molar ratio of 2-methylnonane to 5-methylnonane generated when an iso-decane yield is 5 wt % in a reaction of contacting a normal decane to the hydroisomerization catalyst to be converted into iso-decanes in the presence of hydrogen.

In addition, the present invention provides a hydroisomerization catalyst wherein the molecular sieve containing the organic template is ZSM-23, and the constraint index defined above is in a range of 3.0 to 4.0.

In addition, the present invention provides a hydroisomerization catalyst wherein the molecular sieve containing the organic template is ZSM-48, and the constraint index defined above is in a range of 1.1 to 5.1.

In the hydroisomerization catalyst according to the present invention, in terms of reducing influence to properties of a synthetic raw materials for the molecular sieve that is generally synthesized under a alkaline condition, it is preferable that the organic template is an amine derivative.

In addition, it is preferable that the organic template is one selected from a group consisting of an alkyl amine, an alkyl diamine, an alkyl triamine, an alkyl tetramine, a pyrrolidine, a piperazine, an amino piperazine, an alkyl pentamine, an alkyl hexamine, and derivatives thereof.

In addition, in the hydroisomerization catalyst according to the present invention, in terms of simplification of a catalyst manufacturing process, it is preferable that the ion-exchanged molecular sieve is obtained by performing ion exchange of the molecular sieve containing the organic template in the presence of an ammonium ion or a proton.

Further, in the hydroisomerization catalyst according to the present invention, it is preferable that the ion-exchanged molecular sieve is obtained by performing ion exchange of the molecular sieve containing the organic template through a replacement of the solution with a fresh solution one time or two or more times. In this case, it is possible to increase an efficiency of ion exchange in comparison with a case where the ion exchange is performed without replacement of the solution.

In addition, in the hydroisomerization catalyst according to the present invention, in terms of easily obtaining desired dehydrogenation and hydrogenation catalyst functions, it is preferable that the catalyst composite contains platinum and/or palladium supported on the ion-exchanged molecular sieve or a calcined material thereof.

In addition, in the hydroisomerization catalyst according to the present invention, it is preferable that the catalyst is obtained by performing calcination of the catalyst composite in the ambience containing a molecular oxygen and, after that, reduction in the ambience containing a molecular hydrogen.

In the hydroisomerization catalyst according to the present invention, in terms of easily obtaining desired isomerization ability and desired molding ability and mechanical strength of the catalyst composite, it is preferable that the catalyst composite contains 1 part by weight to 90 parts by weight of the ion-exchanged molecular sieve or a calcined material thereof and 99 parts by weight to 10 parts by weight of a porous oxide which is at least one selected from a group consisting of alumina, silica, titania, boria, magnesia, and zirconia.

In the hydroisomerization catalyst according to the present invention, in terms of easily obtaining desired isomerization ability and desired molding ability and mechanical strength of the catalyst composite, it is preferable that the catalyst composite contains: a carrier obtained by calcining a carrier composite containing 1 part by weight to 90 parts by weight of the ion-exchanged molecular sieve and 99 parts by weight to 10 parts by weight of a porous oxide which is at least one selected from a group consisting of alumina, silica, titania, boria, magnesia, and zirconia; and the metal supported on the carrier.

In addition, the present invention provides a hydrocarbon oil dewaxing method comprising a process of converting a part or the entire of the normal paraffins into iso-paraffins by contacting a hydrocarbon oil containing the normal paraffins and the hydroisomerization catalyst according to the present invention in the presence of hydrogen.

According to the hydrocarbon oil dewaxing method of the present invention, in a case where the hydrocarbon oil is subjected to the catalytic dewaxing by using the hydroisomerization catalyst according to the present invention, although the normal paraffin conversion is increased, it is possible to sufficiently suppress the lightening of the iso-paraffin fraction. Therefore, according to the hydrocarbon oil dewaxing method of the present invention, it is possible to obtain the hydrocarbon oil suitable for the lube-oil base oil and/or the hydrocarbon oil suitable for the fuel base oil with a high yield from the hydrocarbon oil containing the normal paraffins. In addition, with respect to the hydrocarbon oil suitable for the fuel base oil, it is possible to obtain the hydrocarbon oil very suitable for, particularly, the gas oil base oil with a high yield. With respect to the hydrocarbon oil suitable for the lube-oil base oil, it is possible to obtain the hydrocarbon oil suitable for, particularly, the lube-oil base oil having a high viscosity index and a low pour point with a high yield.

In addition, according to the hydrocarbon oil dewaxing method of the present invention, by using the hydroisomerization catalyst according to the present invention, it is possible to increase a content of the multi-branched isomers in the hydrocarbon oil after the dewaxing. Therefore, according to the hydrocarbon oil dewaxing method of the present invention, it is possible to manufacture the lube-oil base oil and/or the fuel base oil having good low-temperature properties with a good economical efficiency.

In addition, according to the hydrocarbon oil dewaxing method of the present invention, by using the hydroisomerization catalyst of the present invention, it is possible to increase a content of the iso-paraffins having a structure where branched chains exist in an inner position of the main chain other than a terminal position thereof in the hydrocarbon oil after the dewaxing. Therefore, according to the hydrocarbon oil dewaxing method of the present invention, it is possible to manufacture the lube-oil base oil and/or the fuel base oil having good low-temperature properties with a good economical efficiency.

In the hydrocarbon oil dewaxing method according to the present invention, in terms of obtaining a lube-oil base oil having a high viscosity index and a good cold flow property and/or a fuel base oil having a good cold flow property with a high yield, it is preferable that the hydrocarbon oil is at least one selected from a group consisting of a slack wax, a de-oiled wax, a paraffin wax, a micro-crystalline wax, petrolatum, and a Fischer-Tropsch synthetic wax.

In addition, the present invention provides a base oil manufacturing method of producing a lube-oil base oil and/or a fuel base oil by performing a process of contacting a hydrocarbon oil containing normal paraffins and the hydroisomerization catalyst according to the present invention in the presence of hydrogen.

According to the base oil manufacturing method of the present invention, even in a case where the normal paraffin conversion is increased during hydroisomerization of the hydrocarbon oil, it is possible to sufficiently suppress the lightening of the iso-paraffin fraction by using the hydroisomerization catalyst according to the present invention. Therefore, according to the base oil manufacturing method of the present invention, it is possible to obtain the lube-oil base oil and/or the fuel base oil from the hydrocarbon oil containing the normal paraffins with a high yield. In addition, with respect to the lube-oil base oil, it is possible to obtain a high quality lube-oil base oil having a high viscosity index and a low pour point with a high yield. With respect to the fuel base oil, it is possible to obtain the gas oil base oil having a good cold flow property with a high yield.

In addition, according to the base oil manufacturing method of the present invention, by using the hydroisomerization catalyst according to the present invention, it is possible to increase a content of the multi-branched isomers in the obtained base oil. Therefore, according to the base oil manufacturing method of the present invention, it is possible to manufacture the lube-oil base oil and/or the fuel base oil having good low-temperature properties with a good economical efficiency.

In addition, according to the base oil manufacturing method of the present invention, by using the hydroisomerization catalyst of the present invention, it is possible to increase a content of the iso-paraffins having a structure where branched chains exist in an inner position of the main chain other than a terminal position thereof in the obtained base oil. Therefore, according to the base oil manufacturing method of the present invention, it is possible to manufacture the lube-oil base oil and/or the fuel base oil having good low-temperature properties with a good economical efficiency.

In the base oil manufacturing method according to the present invention, in terms of obtaining a lube-oil base oil having a high viscosity index and a good cold flow property and/or a fuel base oil having a good cold flow property with a high yield, it is preferable that the hydrocarbon oil is at least one selected from a group consisting of a slack wax, a de-oiled wax, a paraffin wax, a micro-crystalline wax, petrolatum, and a Fischer-Tropsch synthetic wax.

In addition, the present invention provides a lube-oil base oil manufacturing method of obtaining a lube-oil base oil by performing a process of contacting a hydrocarbon oil containing normal paraffins having 10 or more carbon atoms and the hydroisomerization catalyst according to the present invention in the presence of hydrogen under the condition that a normal paraffin conversion defined by the following Equation I is substantially 100 wt %.

Normal paraffin conversion (wt %)=[1(Total Weight
of Cn or more normal paraffins Contained in
After-Contacting hydrocarbon oil)/(Total Weight
of Cn or more normal paraffins Contained in
Before-Contacting hydrocarbon oil)]×100    (I)

In Equation I, Cn denotes a minimum number of carbon atoms in the normal paraffins having 10 or more carbon atoms included in a before-contacting hydrocarbon oil.

Here, "conversion is substantially 100 wt %" denotes that the normal paraffin content in the after-contacting hydrocarbon oil is 0.1 wt % or less.

In particular, according to the lube-oil base oil manufacturing method of the present invention, it is possible to efficiently manufacture such a high quality lube-oil base oil as Group III+ designated in accordance with classification of lube oil grade of the American Petroleum Institute.

Effects of the Invention

According to the present invention, it is possible to provide a hydroisomerization catalyst capable of producing a hydrocarbon oil suitable for a lube-oil base oil and a hydrocarbon oil suitable for a fuel base oil from a hydrocarbon oil containing normal paraffins with a high yield and having a sufficiently high isomerization activity and a sufficiently suppressed cracking activity and to provide a hydrocarbon oil dewaxing method, a base oil manufacturing method, and a lube-oil base oil manufacturing method capable of obtaining a lube-oil base oil and/or a fuel base oil having a good cold flow property with a high yield.

BEST MODES FOR CARRYING OUT THE INVENTION

Hydroisomerization Catalyst

Figure 1:
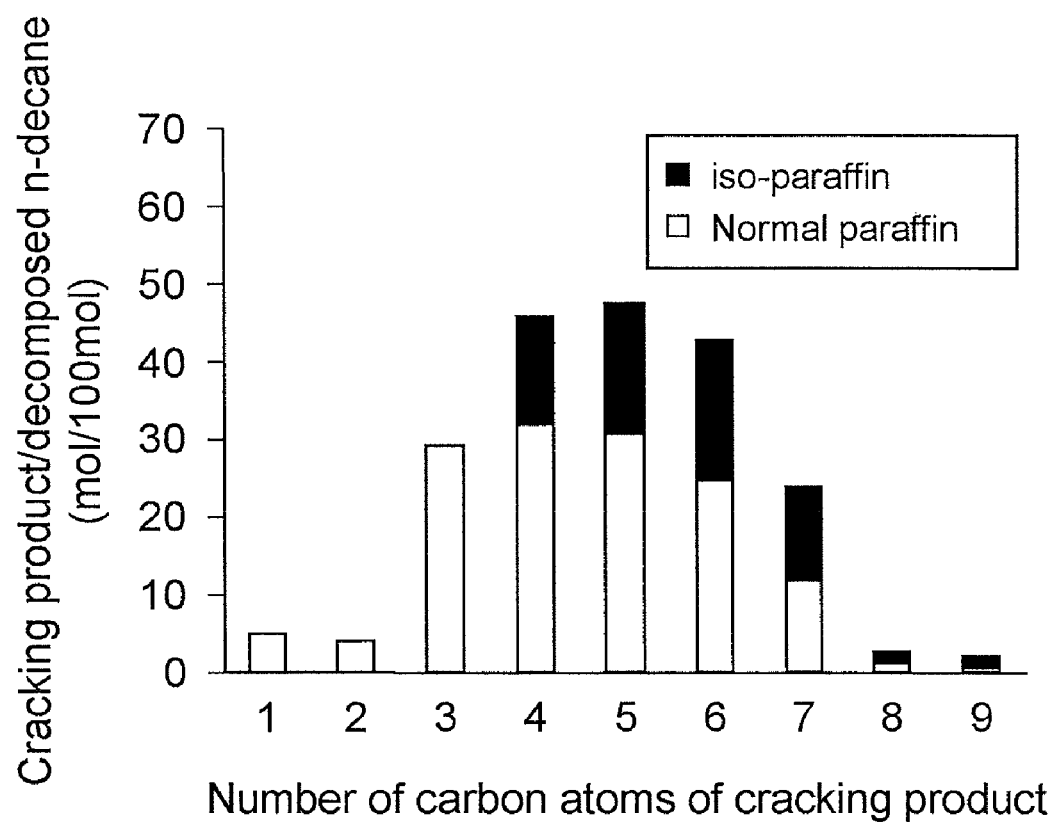
FIG. 1 is a graph illustrating a composition of a cracking products.

A hydroisomerization catalyst according to the present invention is obtained by calcining a catalyst composite including an ion-exchanged molecular sieve or the calcined material thereof which is obtained by performing ion exchange of a molecular sieve containing an organic template in a solution containing a cation species and using water as a main solvent and at least one metal which is selected from a group consisting of metals belonging to Groups 8-10 of the Periodic Table of the Elements, molybdenum, and tungsten supported on the ion-exchanged molecular sieve or the calcined material thereof.

In addition, in a hydroisomerization catalyst according to the present invention, in a case where the catalyst composite contains a calcined material of the ion-exchanged molecular sieve and a metal supported on the calcined material, the calcined material of the ion-exchanged molecular sieve may be contained in a catalyst composite as a carrier obtained by calcining carrier composite containing the ion-exchanged molecular sieve, and the metal supported on the calcined material may be contained in a catalyst composite in a form of being supported on the aforementioned carrier.

A molecular sieve containing the organic template used as a raw material for the ion-exchanged molecular sieve is not specifically limited as long as it is hydrothermally synthesized in the presence of the organic template (sometimes, referred to as a synthetic molecular sieve). In the present invention, the synthetic molecular sieve is preferably a zeolite.

The zeolite used in the present invention preferably has a pore structure having a 10-membered ring or an 8-membered ring in terms of a high isomerization activity and a suppressed cracking activity in a normal paraffin isomerization reaction. More specifically, as a zeolite having a pore structure having a 10-membered ring, there may be AEL, EUO, FER, HEU, MEL, MFI, NES, TON, MTT, WEI, and ZSM-48, and as a zeolite having a pore structure having an 8-membered ring, there may be ANA, CHA, ERI, GIS, KFI, LTA, NAT, PAU, YUG, and DDR. Here, the combinations of three alphabets denote skeleton structure codes for the structures of classified molecular sieve zeolite which are designated by The Structure Commission of The International Zeolite Association. The zeolites having the same topology are collectively referred to as the same code.

In terms of a high isomerization activity and a low cracking activity, among the aforementioned zeolites, the zeolite having the TON structure having a one-dimensional pore structure having a 10-membered ring, the zeolite having the MTT structure, and crystalline aluminosilicate ZSM-48 are preferred. As the zeolite having the TON structure, the crystalline aluminosilicate ZSM-22 is more preferred, and as the zeolite having the MTT structure, the crystalline aluminosilicate ZSM-23 is more preferred.

In a case where the crystalline aluminosilicate ZSM-22, ZSM-23, or ZSM-48 is used as the synthetic molecular sieve, a molar ratio [Si]/[Al] (hereinafter, referred to as a Si/Al ratio) of silicon to aluminum atoms in the crystalline aluminosilicate is preferably in a range of 10 to 400 and more preferably in a range of 20 to 300. If the Si/Al ratio is less than the lower limit, a normal paraffin conversion activity is high, but an iso-paraffin isomerization selectivity is deteriorated. In addition, the cracking reaction accompanied with an increase in a reaction temperature tends to greatly increase. Therefore, the case that the Si/Al ratio is less than the lower limit is not preferable. If the Si/Al ratio is more than the upper limit, it is difficult to obtain a catalyst activity required for the normal paraffin conversion. Therefore, the case that the Si/Al ratio is more than the upper limit is not preferable.

The organic template used for the hydrothermal synthesis of the molecular sieve is selected according to a structure of the synthesized molecular sieve. However, since the molecular sieve is generally synthesized under the alkaline condition, an amine derivative is preferred in terms of capability of reducing influence to properties of synthetic raw materials.

In addition, the organic template is preferably one selected from a group consisting of an alkyl amine, an alkyl diamine, an alkyl triamine, an alkyl tetramine, a pyrrolidine, a piperazine, an amino piperazine, an alkyl pentamine, an alkyl hexamine, and derivatives thereof.

In general, after the hydrothermal synthesis, the molecular sieve constituting a conventional catalyst for catalytic dewaxing process is calcined at a temperature of about 550° C. or higher in the ambience containing molecular oxygen so as to remove the organic template contained therein. The temperature is selected in order to remove the organic template by sufficient combustion. After the calcination, the conventional catalyst is manufactured by performing ion exchange, loading of a metal component, and activation by calcination. On the other hand, the hydroisomerization catalyst according to the present invention is obtained by performing the later-described ion exchange process in a solution containing a cation species and using water as a main solvent and by using the obtained ion exchanged molecular sieve.

The molecular sieve containing the organic template according to the present invention may be the one in which all the organic template is not substantially removed by the calcination. Namely, before the organic template is removed by the ion exchange, the calcination of the synthetic molecular sieve may not be performed at all, or even in a case where the calcination is performed, the calcination may not be performed under the condition that all the organic template is substantially burned out to be removed, particularly, in the high temperature condition. In a case where the calcination of the synthetic molecular sieve is performed in the ambience containing molecular oxygen, as the calcination temperature, about 500° C. or lower is preferable, 450° C. or lower is more preferable, and 400° C. or lower is further more preferable, so that all the organic template is not substantially burned to be removed. In the present invention, it is the most preferable that, before the organic template is removed by the ion exchange, the calcination of the synthetic molecular sieve is not performed at all.

If the calcination of the synthetic molecular sieve is performed under the condition that all the organic template is substantially burned to be removed before the organic template is removed by the ion exchange, the properties of the catalyst according to the present invention such as a sufficiently high isomerization activity, a suppressed cracking activity, a high multi-branched isomer selectivity, or a lower CI° in the normal paraffin isomerization reaction in the presence of the hydrogen may not be obtained. In addition, as one reason therefor, it is considered that a temperature of the synthetic molecular sieve substantially exceeds a ambience temperature due to heat during the combustion of the organic template, so that a structure of the molecular sieve may be changed by a high-temperature steam generated by the combustion of the organic template.

The ion-exchanged molecular sieve according to the present invention is obtained by performing the ion exchange of the synthetic molecular sieve containing the organic template in a solution containing a cation species and using water as a main solvent.

Here, "to use water as a main solvent" denotes that a content of water is 50 wt % or more with respect to a total amount of the solvent in the solution. In the present invention, the content of water is preferably 70 wt % or more, and more preferably, 100 wt %.

In addition, in a case where the solution contains an organic solvent, a content thereof is less than 50 wt % with respect to the total amount of the solvent in the solution, and more preferably, 30 wt % or less. If the content of the organic solvent is 50 wt % or more, when a compound for supplying a cation species for the ion exchange is used, a solubility of the compound to the solvent may be deteriorated. Therefore, it is the most preferable that the organic solvent is not contained in the solution.

Incidentally, in U.S. Pat. No. 5,143,879, disclosed is a method of performing ion exchange a molecular sieve containing an organic template in a synthesized state in a solution consisting of a specific polar non-aqueous solvent containing a cation in order to remove and recover the organic template from the molecular sieve without burning out the expensive organic template.

However, in a case where the main solvent in the solution used for performing the ion exchange is not water but an organic solvent, the hydroisomerization catalyst composed of the obtained ion exchange molecular sieve has a tendency not to easily acquire the characteristics obtained by the catalyst according to the present invention, that is, a sufficiently high isomerization activity, a sufficiently suppressed cracking activity, and a high multi-branched isomer selectivity in an isomerization reaction of normal paraffins in the presence of hydrogen. Although the reasons are not completely understood, as described in the later-mentioned example, in the ion exchange process in a solution containing an organic solvent as a main solvent, it is considered to be that a suitable amount of the organic template contained in the molecular sieve having a pore structure having a 10-membered ring or an 8-membered ring is not easily removed and/or that a sufficient amount of alkali metal ions, that is, counter ions generally contained in the molecular sieve synthesized using a hydrothermal synthesis is not easily removed.

In the molecular sieve as hydrothermally synthesized, an alkali metal cation or an alkalin earth metal cation exists as a counter cation. In the aforementioned ion exchange, such a counter cation is subjected to the ion exchange, and the organic template is suitably removed simultaneously.

The cation species contained in the solution using water as a main solvent is not limited to a specific one, but various cation species may be used. In the catalyst according to the present invention, in terms of forming useful Brownsted acid sites, an ammonium ion or a proton is preferable. In a case where the proton is used as the cation species, a mineral acid such as a hydrochloric acid, a sulfuric acid, and an acetic acid is generally used. In addition, the ammonium type molecular sieve obtained by performing the ion exchange in the presence of the ammonium ion generates ammonia during the calcination of the catalyst composite. As a result, the counter cation becomes to the proton, so that the Brownsted acid sites are formed. As a compound for supplying the ammonium ion in the solution, there is an ammonium chloride, an ammonium sulfate, an ammonium nitrate, an ammonium phosphate, an ammonium acetate, or other inorganic and organic ammonium salts. In the most preferred embodiment of the present invention, the cation species is an ammonium ion. A content of the cation species contained in the solution is preferably set to be in a range of 10 to 1,000 equivalents with respect to a sum of amounts of the organic template and the counter cation contained in the used molecular sieve.

Preferably, the ion exchange is performed by immersing a powdery synthetic molecular sieve, a molded body of a synthetic molecular sieve, or a molded body of a mixture of a synthetic molecular sieve and a binder in a solution containing the cation species and using water as a main solvent, preferably in a aqueous solution and by stirring or flowing the resulting mixture.

In addition, the stirring or the flowing is preferably performed under the heating in order to increase an ion exchange efficiency. According to the present invention, it is preferable that the ion exchange is performed under the boiling and refluxing state by heating an aqueous solution containing the cation species.

Besides the aforementioned condition, a time interval of ion exchange is preferably in a range of about 1 to 24 hours. In terms of the ion exchange efficiency and economical efficiency, an amount of the solution contacting the synthetic molecular sieve is preferably in a range of 0.01 L to 10 L per 1 g of synthetic molecular sieve. In addition, in terms of increasing the ion exchange efficiency, during the ion exchange of the synthetic molecular sieve in the solution, it is preferable that the solution is replaced with a fresh solution one time or two or more times. It is more preferable that the solution is replaced with a fresh solution one time or two times. In a case where the solution is replaced one time, for example, by immersing the synthetic molecular sieve in the solution containing the cation species using water as a main solvent, by heating and refluxing the resulting mixture for 1 to 6 hours, by replacing the solution with a fresh solution, and by heating and refluxing it for 6 to 12 hours, the ion exchange efficiency can be increased.

Preferably, the ion-exchanged molecular sieve is extracted by filtration, rinsed with a de-ionized water, and dried in a temperature of about 60 to 130° C. for about 10 to 48 hours.

At least one metal which is selected from a group consisting of metals belonging to Groups 8-10 of the Periodic Table of the Elements, molybdenum, and tungsten is supported on the ion-exchanged molecular sieve or a calcined material thereof. As preferred metals belonging to Groups 8-10 of the Periodic Table of the Elements, there are iron, ruthenium, osmium, cobalt, rhodium, iridium, nickel, palladium, and platinum. Further, among the metals, in terms of an activity, a selectivity, and an activity durability, the platinum and/or the palladium are preferable, and the platinum is more preferable. One metal or a combination of two or more metals which are selected from a group consisting of metals belonging to Groups 8-10 of the Periodic Table of the Elements, molybdenum, and tungsten may be used.

In addition, in a case where the hydroisomerization catalyst according to the present invention is used for hydroisomerization of a hydrocarbon oil containing a large amount of sulfur-containing compounds and/or nitrogen-containing compounds, in terms of a catalyst activity durability, it is preferable that a combination of metals such as nickel-cobalt, nickel-molybdenum, cobalt-molybdenum, nickel-molybdenum-cobalt, and nickel-tungsten-cobalt is loaded on the ion-exchanged molecular sieve or a calcined material thereof.

As a method of loading the metal on the ion-exchanged molecular sieve or a calcined material thereof, well-known methods such as an impregnation method (an equilibrium absorption method, a pore filling method, or an initial wetting method) and an ion exchange method may be used. As a compound containing the metal element used in this case, there is a hydrochloride, a sulfate, a nitrate, or complexes of the metal. In addition, as a compound containing platinum, there are a platinum chloride, a tretraammine dinitro platinum, a dinitro amino platinum, and a tretraammine dinitro platinum.

An amount of the metal loaded on the ion-exchanged molecular sieve or a calcined material thereof is preferably in a range of 0.001 to 20 wt % with respect to a weight of the ion-exchanged molecular sieve or a calcined material thereof. If the loading amount is less than the lower limit, it is difficult to obtain a predetermined hydrogenation/dehydrogenation ability. If the loading amount is more than the upper limit, a lightening of the hydrocarbon due to cracking on the metal easily occurs, so that a desired fraction yield may be lowered. In addition, a catalyst cost may be increased.

As a condition of calcining the catalyst composite containing the ion-exchanged molecular sieve or a calcined material thereof and the metal supported on the ion-exchanged molecular sieve or a calcined material thereof, a temperature is preferably in a range of 250° C. to 600° C. and more preferably in a range of 300 to 500° C. in the ambience containing a molecular oxygen. As the ambience containing a molecular oxygen, there is an oxygen gas, an oxygen gas diluted with an inert gas such as nitrogen, and an air. A time interval of the calcination is generally in a range of about 0.5 to 20 hours. By the calcination process, the compound containing the metal element supported on the ion-exchanged molecular sieve or a calcined material thereof is transformed into a metal elemental substance, an oxide thereof, or a similar material, so that the obtained catalyst is provided with a normal paraffin isomerization activity. If the calcination temperature deviates from the aforementioned range, the catalyst activity and the selectivity may be insufficient.

In addition, in a case where an organic template is remained in the ion-exchanged molecular sieve, the residual organic template can be burned to be completely removed by the aforementioned calcination process. In addition, in the present invention, the organic template can be sufficiently removed by the calcination at relatively low temperature. It is considered that this is because the metal having a catalytic activity for an oxidation reaction is loaded on the ion-exchanged molecular sieve according to the present invention, so that the oxidation reaction (combustion) of the organic template can be performed at a lower temperature due the operation thereof.

In addition, in a case where the ion-exchanged molecular sieve is an ammonium type molecular sieve, during the calcination process, an ammonium counter cation generates ammonia to be a proton, so that Brownsted acid sites are formed.

According to the present invention, it is preferable that, after the calcination process, the hydroisomerization catalyst is subjected to a reduction process in a temperature of preferably 250 to 500° C. and more preferably 300 to 400° C. in the ambience containing a molecular hydrogen for about 0.5 to 5 hours. Due to the processes, a high activity for the hydrocarbon oil dewaxing can be more surely provided to the catalyst.

In the hydroisomerization catalyst according to the present invention, it is preferable that the catalyst composite is molded into a predetermined shape. As an example of the shape, there are a cylinder shape, a pellet shape, a sphere shape, and a heteromorphic cylinder shape having three-sheet/four-sheet cross section. When the catalyst composite is molded into such a shape, the catalyst obtained therefrom by the calcination can have an increasing mechanical strength. In addition, handling of the catalyst can be easier and a pressure loss of reaction fluid during the reaction can be reduced. The molding of the catalyst composite can be performed by using a well-known method.

In the catalyst composite, a content of the ion-exchanged molecular sieve or a calcined material thereof is in a range of preferably 1 to 90 wt % and more preferably 10 to 80 wt % with respect to a total amount of the catalyst composite.

In addition, in terms of improving molding ability of the catalyst and mechanical strength of the molded catalyst, the catalyst composite preferably includes at least one porous oxide which is selected from a group consisting of alumina, silica, titania, boria, magnesia, and zirconia. In this case, in the catalyst composite, a composition ratio of the ion-exchanged molecular sieve or a calcined material thereof and the porous oxide is preferably 1 to 90 parts by weight and 99 to 10 parts by weight, and more preferably 10 to 80 parts by weight and 90 to 20 parts by weight.

In a case where the porous oxide is contained in the catalyst composite, a carrier consisting of a carrier composite containing the ion-exchanged molecular sieve and a porous oxide may be molded before the metal is loaded on the ion-exchanged molecular sieve, and alternatively, a mixture of the ion-exchanged molecular sieve on which the metal is loaded and the porous oxide may be molded. In the present invention, the former method is preferred. Namely, it is preferable that, after the synthetic molecular sieve containing the organic template is subjected to the ion exchange in the solution containing a cation species and using water as a main solvent, a carrier composite obtained by mixing the ion-exchanged molecular sieve, the porous oxide, and, if needed, other binder components is molded. In addition, it is preferable that the obtained molded body is calcined at a temperature of about 500° C. to 600° C. under the ambience containing a molecular oxygen in order to derive a solid acidity of the porous oxide.

In the hydroisomerization catalyst according to the present invention, metals other than metals belonging to Groups 8-10 of the Periodic Table of the Elements, molybdenum, and tungsten may be loaded on the ion-exchanged molecular sieve or a calcined material thereof within a range not deteriorating the effects of the present invention. In addition, in a case where the catalyst composite contains the porous oxide, metals other than metals belonging to Groups 8-10 of the Periodic Table of the Elements, molybdenum, and tungsten may be loaded on the ion-exchanged molecular sieve or a calcined material thereof and/or the porous oxide.

In the hydroisomerization catalyst according to the present invention, in a case where the synthetic molecular sieve used as a raw material of the catalyst is the crystalline aluminosilicate ZSM-22, the constraint index $CI°$ defined as follows is preferably in a range of 7 to 12 and more preferably 7 to 11.

Constraint index: a molar ratio of 2-methylnonane to 5-methylnonane generated when an iso-decane yield is 5 wt % in a reaction of contacting a normal decane to the hydroisomerization catalyst to be converted into iso-decanes in the presence of hydrogen.

The above-mentioned constraint index $CI°$ is smaller than that of a conventional catalyst which can be obtained by using the same type synthetic molecular sieve, and the constraint index $CI°$ can be achieved by the aforementioned ion exchange according to the present invention. The above-mentioned hydroisomerization catalyst is very advantageous to lower the pour point of a base oil such as a lube-oil base oil or a fuel base oil which is manufactured by the catalytic dewaxing of a hydrocarbon oil containing a wax component.

In addition, in the hydroisomerization catalyst according to the present invention, in a case where the synthetic molecular sieve used as a raw material of the catalyst is the crystalline aluminosilicate ZSM-23, the above-defined constraint index $CI°$ is preferably in a range of 3.0 to 4.0. The constraint index $CI°$ is also smaller than that of a conventional catalyst which can be obtained by using the same type synthetic molecular sieve, and the above-mentioned constraint index $CI°$ can be achieved by the aforementioned ion exchange according to the present invention. The above-mentioned hydroisomerization catalyst is very advantageous to lower the pour point of a base oil such as a lube-oil base oil or a fuel base oil which is manufactured by the catalytic dewaxing of a hydrocarbon oil containing a wax component.

In addition, in the hydroisomerization catalyst according to the present invention, in a case where the synthetic molecular sieve used as a raw material of the catalyst is the crystalline aluminosilicate ZSM-48, the above-defined constraint index $CI°$ is preferably in a range of 1.1 to 5.1. The constraint index $CI°$ is also smaller than that of a conventional catalyst which can be obtained by using the same type synthetic molecular sieve, and the above-mentioned constraint index $CI°$ can be achieved by the aforementioned ion exchange according to the present invention. The above-mentioned hydroisomerization catalyst is very advantageous to lower the pour point of a base oil such as a lube-oil base oil or a fuel base oil which is manufactured by the catalytic dewaxing of a hydrocarbon oil containing a wax component.

<Method of Manufacturing Hydroisomerization Catalyst>

A method of manufacturing the hydroisomerization catalyst according to the present invention may include a process (a) of obtaining an ion-exchanged molecular sieve by performing ion exchange of a molecular sieve containing an organic template in a solution containing a cation species and using water as a main solvent, a process (b) of loading at least one metal which is selected from a group consisting of metals belonging to Groups 8-10 of the Periodic Table of the Elements, molybdenum, and tungsten on a carrier containing the ion-exchanged molecular sieve obtained in the process (a), and a process (c) of calcining a catalyst composite containing the carrier obtained in the process (b).

In the process (a), the same molecular sieve containing the organic template, the same solution for the ion exchange containing a cation species and using water as a main solvent and the same ion exchange conditions as described in the explanation of the hydroisomerization catalyst according to the present invention are preferably used.

In the process (b), a carrier obtained by molding the ion-exchanged molecular sieve obtained in the process (a) may be used. Alternatively, however, it is preferable that the carrier is obtained by molding a mixture of the ion-exchanged molecular sieve obtained in the process (a), at least one porous oxide which is selected from a group consisting of alumina, silica, titania, boria, magnesia, and zirconia, and, if needed, other binder components. The molded body is preferably calcined at a temperature of about 500° C. to 600° C. under the ambience containing a molecular oxygen.

In the process (b), the same metal and method of loading thereof as described in the explanation of the hydroisomerization catalyst according to the present invention are preferably used.

In the process (c), the same calcining conditions as described in the explanation of the hydroisomerization catalyst according to the present invention are preferably used. In addition, it is preferable, after the process (c), the aforementioned reduction process described with respect to the hydroisomerization catalyst according to the present invention is performed.

As described above, in general, after the hydrothermal synthesis, the molecular sieve constituting a conventional catalyst for catalytic dewaxing process is calcined at a temperature of about 550° C. or higher in the ambience containing a molecular oxygen so as to remove the organic template contained therein. After the calcination, the ion exchange is performed. On the other hand, in the hydroisomerization catalyst according to the present invention, the ion-exchanged molecular sieve obtained by ion exchange of the molecular sieve containing the organic template in a solution containing a cation species and using water as a main solvent is used as a constituting material.

Here, in a case where the crystalline aluminosilicate is used as the synthetic molecular sieve, there may be a structural difference between an ion-exchanged molecular sieve constituting a conventional catalyst obtained by removing the organic template through calcination and, after that, performing the ion exchange process and the ion-exchanged molecular sieve according to the present invention as follows.

(1) In case of the conventional catalyst, an atomic ratio of silicon/aluminum on a surface of the crystalline aluminosilicate obtained in X-ray photoelectron spectroscopic analysis (XPS) is decreased in comparison with that of the synthetic molecular sieve. However, in the ion-exchanged molecular sieve according to the present invention, the decrease in the atomic ratio of silicon/aluminum can be suppressed.

(2) In case of the conventional catalyst, with respect to a 2p orbit signal of aluminum on the surface of the crystalline aluminosilicate in the XPS, the intensity of the signals assigned to Al (V) and/or Al (VI) tend to be increased. However, in the ion-exchanged molecular sieve according to the present invention, the increase can be suppressed.

(3) In case of the conventional catalyst, a chemical shift (a top position of signal) of a spectrum in a $^{27}$Al magic angle spinning (MAS) NMR analysis changes toward a lower magnetic field, and a width of the signal is narrowed. However, in the ion-exchanged molecular sieve according to the present invention, such phenomena can be suppressed.

In addition, in (3), the aluminum atoms in the crystalline aluminosilicate may exist at different T sites, and such signals may be generally considered to be combined and observed as a single signal in the NMR spectrum. In the conventional calcination process, a change in the chemical shift at the top position of the signal may be considered to represent that the ratio of aluminum atoms existing at the different T sites are changed. In addition, the narrowed width of the signal may be considered to represent that a shielding effect to a resonance frequency becomes weak. In any case, it is suggested that aluminum atoms in environments different from that of a molecular sieve at the time of synthesis exist, or a change in composition ratio of aluminum atoms in a plurality of different environments occurs. In the method of manufacturing the ion-exchanged molecular sieve according to the present invention, such a change of aluminum species may be considered to be suppressed.

(Method of Manufacturing Base Oil)

A method of manufacturing a base oil according to the present invention is characterized by obtaining a lube-oil base oil and/or a fuel base oil by a hydroprocessing process of contacting a hydrocarbon oil containing normal paraffins and the aforementioned hydroisomerization catalyst according to the present invention in the presence of hydrogen. As an example of the fuel base oil, there are a gas oil, a kerosene, and a gasoline. As an example of the lube-oil base oil, there are lube-oil base oils for automotive use, transportation use, industrial use, shipping use and aviation use.

A hydrocarbon oil used as a feedstock may be suitably selected according to a use of the obtained base oil. In a case where the lube-oil base oil and/or the gas oil base oil are to be produced, a hydrocarbon oil containing normal paraffins having 10 or more carbon atoms is preferably used as a feedstock oil. Normal paraffins having 10 or more carbon atoms deteriorates cold flow property of the lube-oil base oil or the gas oil base oil. However, in the method of manufacturing the base oil according to the present invention, the lube-oil base oil and/or the gas oil base oil with good cold flow property can be obtained with a high yield from the hydrocarbon oil containing normal paraffins having 10 or more carbon atoms. In addition, in order to efficiently manufacture the lube-oil base oil and/or the gas oil base oil, it is preferable that a hydrocarbon oil containing a hydrocarbon having a boiling point exceeding 230° C., preferably exceeding 315° C., with a content of 50 wt % or more, preferably 70 wt % or more, and more preferably 90 wt % or more is used as the feedstock oil.

In addition, the method of manufacturing the base oil according to the present invention is employed to manufacture the base oil or to manufacture the lube-oil base oil and the gas oil base oil, it is preferable that the feedstock oil contains a hydrocarbon oil having an initial boiling point that is higher than the initial boiling point of a desired lube-oil base oil. As an example of the feedstock oil, a fraction having a normal pressure reduced boiling point exceeding 360° C. such as a petroleum fraction and a synthetic oil or wax is suitable. More specifically, there are a heavy gas oil, a vacuum gas oil, a lube oil raffinate, a bright stock, a slack wax (coarse wax), a wax-reduced oil, a de-oiled wax, a paraffin wax, a microcrystalline wax, a petrolatum, a synthetic oil, a Fischer-Tropsch synthetic oil, a high-pour-point polyolefin and a straight chain α olefin wax. These materials may be used alone or in a combination of two or more thereof. In addition, these feedstock oils are preferably hydrotreated or slightly hydrocracked. Due to these treatments, such materials deteriorating the activity of the hydroisomerization catalyst as sulfur-containing compounds and nitrogen-containing compounds and such materials of deteriorating a viscosity index of the lube-oil base oil as aromatic hydrocarbons and naphthenic hydrocarbons can be reduced or removed.

The aforementioned relatively heavy hydrocarbon oil is used as a feedstock oil, and the hydrocarbon oil is contacted to the hydroisomerization catalyst according to the present invention in the presence of hydrogen, so that the isomerization of the normal paraffins contained in the hydrocarbon oil, that is, the dewaxing reaction for the hydrocarbon oil can be performed while the lightening is sufficiently suppressed. As a result, it is possible to obtain a base oil in which a content of a fraction with a normal pressure reduced boiling point exceeding 360° C. is 90 wt % or more with a high yield. In addition, according to the base oil manufacturing method of the present invention, it is possible to obtain a base oil containing a large amount of the isomers having a branched chain structure. In particular, in a high quality lube-oil base oil, a content of the normal paraffins is required to be 0.1 wt % or less, and it is possible to obtain a lube-oil base oil satisfying the required level with a high yield according to the base oil manufacturing method of the present invention.

In addition, according to the base oil manufacturing method of the present invention, since a base oil containing a large amount of the multi-branched isomers can be obtained, it is possible to manufacture a lube-oil base oil having a good cold flow property from the aforementioned feedstock oil with a good economical efficiency.

In addition, according to the base oil manufacturing method of the present invention, since a base oil containing a large amount of the isomers having a large number of branched chains in an inner position of the main chain, it is possible to manufacture a lube-oil base oil having a good cold flow property from the aforementioned feedstock oil with a good economical efficiency. In particular, in case of the hydroisomerization catalyst that is manufactured by using at least one crystalline aluminosilicate that is selected from a group consisting of ZSM-22, ZSM-23, and ZSM-48 as a synthetic molecular sieve, it is possible to easily obtain the aforementioned effects.

In the base oil manufacturing method according to the present invention, it is possible to separate a base oil suitable for a purpose by distilling the product obtained after the hydroprocessing process.

For example, a fraction having a normal pressure reduced boiling point of 170 to 360° C. can be obtained as a gas oil base oil. As described above, according to the base oil manufacturing method of the present invention, since a base oil having a large amount of the multi-branched isomers can be obtained, it is possible to provide the fraction with such good characteristics as a small amount of normal paraffin component and a good cold flow property.

In addition, the base oil manufacturing method according to the present invention can be employed to a gas oil base oil manufacturing method of which main purpose product is a gas oil base oil. In this case, it is preferable that the lighter hydrocarbon oil is used as a feedstock than that of the case where a main purpose is to manufacture the lube-oil base oil or the lube-oil base oil and gas oil base oil. More specifically, a hydrocarbon oil preferably contains 50 wt % or more, preferably 70 wt % or more, more preferably 90 wt % or more of hydrocarbon having a normal pressure reduced boiling point of 230 to 800° C.

In the hydroprocessing process of the base oil manufacturing method according to the present invention, it is preferable that a reaction temperature is in a range of generally 200 to 450° C., preferably 220 to 400° C. If the reaction temperature is lower than the lower limit, it is difficult to perform the isomerization of the normal paraffins contained in the feedstock, that is, the hydrocarbon oil, so that the wax component tends to be insufficiently reduced or removed. On the other hand, if the reaction temperature is higher than the upper limit, the hydrocarbon oil is greatly cracked, so that the yield of the objective base oil tends to be decreased.

In the hydroprocessing process, a reaction pressure is in a range of generally 0.1 to 20 MPa, preferably 0.5 to 15 MPa. If the reaction pressure is lower than the lower limit, the deterioration of the catalyst tends to rapidly proceed due to the generation of coke. On the other hand, if the reaction pressure is higher than the upper limit, since construction cost of apparatuses is increased, an economical process tends to be difficult to implement.

In the hydroprocessing process, a liquid space velocity of the hydrocarbon oil to the catalyst is in a range of generally 0.01 to 100 $hr^{-1}$, preferably 0.1 to 50 $hr^{-1}$. If the liquid space velocity is lower than the lower limit, an excessive cracking of the hydrocarbon oil is easy to proceed, so that a production efficiency of the objective base oil tends to be decreased. On the other hand, if the liquid space velocity is higher than the upper limit, the isomerization of the normal paraffins contained in the hydrocarbon oil is difficult to proceed, so that the wax component tends to be insufficiently reduced or removed.

In the hydroprocessing process, a supplying ratio of the hydrogen and the hydrocarbon oil is in a range of generally 100 to 1000 $Nm^3/m^3$, preferably 200 to 800 $Nm^3/m^3$. If the supplying ratio is lower than the lower limit, in a case where the feedstock oil contains sulfur-containing or nitrogen-containing compounds, since a hydrogen sulfide gas or a ammonia gas generated from a desulphurization reaction or a denitrogenation reaction performed together with the isomerization reaction is adsorbed to the active metals on the catalyst, a predetermined catalytic performance is difficult to obtain. If the supplying ratio is higher than the upper limit, since hydrogen supplying facilities having a large capacity are needed, an economical process tends to be difficult to implement.

In the hydroprocessing process, the conversion of the normal paraffins is suitably adjusted according to a use of the base oil.

In the lube-oil base oil manufacturing method according to the present invention, the lube-oil base oil is obtained by contacting a hydrocarbon oil containing normal paraffins having 10 or more carbon atoms and the hydroisomerization catalyst under the condition that the normal paraffin conversion defined by the following Equation I is substantially 100 wt %.

Normal paraffin conversion (wt %)=[1(Total Weight of Cn or more normal paraffins Contained in After-Contacting hydrocarbon oil)/(Total Weight of Cn or more normal paraffins Contained in Before-Contacting hydrocarbon oil)]×100    (I)

In Equation I, Cn denotes a minimum number of carbon atoms in the normal paraffins having 10 or more carbon atoms included in a before-contacting hydrocarbon oil.

Here, "the conversion is substantially 100 wt %" denotes that a content of the normal paraffins in the after-contacting hydrocarbon oil is 0.1 wt % or less.

In the hydroisomerization of the hydrocarbon oil containing the normal paraffins, the normal paraffin conversion is generally increased by, for example, raising the reaction temperature, so that a content of the normal paraffins in the obtained reaction product can be lowered. Accordingly, it is possible to improve a cold flow property of the hydrocarbon oil. However, if the reaction temperature is elevated, the cracking reaction of the hydrocarbon oil in the feedstock and the isomerization product is accelerated, so that the light fraction is increased according to the increase in the normal paraffin conversion. Since the increase in light fraction results in deterioration of a viscosity index of the hydrocarbon oil, the light fraction needs to be separated and removed through distillation or the like in order to control the performance of lube-oil base oil within a predetermined range. In particular, in a case where such a high quality lube-oil base oil as Group III+ designated in accordance with classification of lube oil grade of the American Petroleum Institute is manufactured by using the catalytic dewaxing of the hydrocarbon oil, the conversion of the normal paraffin contained in the feedstock, that is, the hydrocarbon oil needs to be substantially 100%. In a lube-oil base oil manufacturing method using a conventional catalyst for catalytic dewaxing, under the condition that the normal paraffin conversion is substantially 100%, the yield of such a high quality lube-oil base oil is very lowered. However, according to the lube-oil base oil manufacturing method of the present invention, although the hydroprocessing process is performed under the condition that the normal paraffin conversion is substantially 100%, the yield of such a high quality lube-oil base oil can be maintained in a high level.

The facilities of performing the base oil manufacturing method according to the present invention is not limited to a specific one, but well-known facilities may be used. As the reaction facilities, any one of a continuous flowing type, a batch type, and a semi-batch type may be used. However, in terms of productivity and efficiency, the continuous flowing type is preferred. As the catalyst layer, any one of a fixed bed, a moving bed, and a stirring bed may be used. However, in terms of cost of facilities, the fixed bed is preferred. As a reaction phase, a gas-liquid mixed phase is preferred.

In the base oil manufacturing method according to the present invention, as a preparation step for the hydroprocessing process, the hydrocarbon oil of the supplied feedstock may be subjected to a hydrotreating process or a hydrocracking process. The facilities, the catalysts, and the reaction conditions are well known in the related art. By performing such a preparation step, the activity of the hydroisomerization catalyst according to the present invention can be maintained for a longer time, and such environmental load materials as sulfur-containing compounds and nitrogen-containing compounds contained in the product can be reduced.

In addition, in the base oil manufacturing method according to the present invention, the reaction product obtained in the hydroprocessing process may be further subjected to, for example, hydrofinishing. The hydrofinishing may be performed by contacting a to-be-finished material to a supported metal hydrogenation catalyst (for example, alumina-supported platinum) generally in the presence of hydrogen. Due to the hydrofinishing, a color and an oxidation stability of the reaction products obtained in the hydroprocessing process can be improved, so that a quality of products can be improved. The hydrofinishing may be performed in facilities different from those for the hydroprocessing process. The catalyst layer for the hydrofinishing may be disposed at the down stream of the catalyst layer for the hydroisomerization catalyst according to the present invention which is disposed in the reactor for performing the hydroprocessing process, so that the hydrofinishing is performed next to the hydroprocessing process.

Incidentally, the isomerization generally denotes a reaction of changing a molecular structure without a change in the number of carbon atoms (molecular weight), and the cracking denotes a reaction accompanied with a decrease in the number of carbon atoms (molecular weight). In the catalytic dewaxing reaction using the isomerization reaction, cracking of the feedstock hydrocarbon and isomerization products occurs to some degree. However, as long as the number of carbon atoms (molecular weight) of the cracking products is within a predetermined allowable range to constitute the desired base oil, the cracking products may be the components constituting the base oil.

(Hydrocarbon Oil Dewaxing Method)

Next, the hydrocarbon oil dewaxing method according to the present invention is described. The hydrocarbon oil dewaxing method according to the present invention includes a process of coverting a part or the whole of the normal paraffins into iso-paraffins by contacting a hydrocarbon oil containing normal paraffins and the hydroisomerization catalyst according to the present invention in the presence of hydrogen.

The hydrocarbon oil used for the hydrocarbon oil dewaxing method according to the present invention is not limited to a specific one, but any one containing normal paraffins may be used. The hydrocarbon oil may contain normal paraffins having, preferably, 10 or more carbon atoms, more preferably, 15 or more carbon atoms. More specifically, various materials from a relatively light distillate such as a kerosene and a jet fuel to a high boiling-point feedstock oil such as all crude oils, a normal pressure distillation residual oil, a vacuum tower residual oil, a reduced pressure residual oil, a recycle oil, a synthetic crude oil (for example, shale oil and tar oil), a gas oil, a vacuum gas oil, a wax-reduced oil, a fuel fraction or a wax fraction derived from Fischer-Tropsch synthetic oil, and others such as a heavy oil may be used. In addition to the normal paraffins, such a hydrocarbon oil may contain a wax component made of a naphthenic hydrocarbon or an aromatic hydrocarbon having a long straight chain alkyl group in a side chain.

As the hydrocarbon oil which is dewaxed by the hydrocarbon oil dewaxing method according to the present invention, a hydrocarbon oil constituted of a hydrocarbon having a boiling point of about 180° C. or higher and 10 or more carbon atoms is particularly preferred. In general, since a lighter hydrocarbon oil does not substantially contain a wax component which influences a cold flow property, there is no need to dewax the hydrocarbon oil, and the effects of the present invention is difficult to obtain.

On the other hand, the dewaxing method according to the present invention can be particularly effectively used for a distillate feedstock oil containing a wax component, that is, medium distillate feedstock oil including a gas oil, a kerosene, and a jet fuel, a lube-oil feedstock oil, a heating oil, and other distillation fraction, of which a pour point and a viscosity need to be maintained in a predetermined range. As the aforementioned hydrocarbon oil, there are a gas oil that is subjected to a hydrotreating process or a hydrocracking process, a heavy gas oil, a vacuum gas oil, a lube oil raffinate, a feedstock oil for lube oil, a bright stock, a slack wax (coarse wax), a wax-reduced oil, a de-oiled wax, a paraffin wax, a micro-crystalline wax, a petrolatum, a synthetic oil, a Fischer-Tropsch synthetic oil, a high-pour-point polyolefin, and a straight chain α-olefin wax. These materials may be used in alone or a combination of two or more thereof.

In the hydrocarbon oil dewaxing method according to the present invention, the reaction conditions for converting at least a portion of the normal paraffins into the iso-paraffins may be set to similar to those of the aforementioned base oil manufacturing method according to the present invention.

EXAMPLES

The present invention is described below in more detail referring to the examples. However, the present invention is not limited to the examples.

tions. Each portion was transferred to a stainless steel autoclave reactor having an inner volume of 120 mL. A reaction was performed in an oven at a temperature of 150° C. for 60 hours while the autoclave reactor itself was rotated with a rotation speed of about 60 rpm. After the reaction was ended, the reactor was cooled, and a generated solid content was extracted by filtration, rinsed with an ion-exchanged water, and dried overnight in a drying unit at a temperature of 60° C., so that the ZSM-22 having an Si/Al ratio of 45 was obtained.

In addition, each of other 6 types of ZSM-22 having different Si/Al ratios was synthesized in the same procedures except that a brending amount of the aluminum sulfate 18-hydrate is changed.

TABLE 1

|  | Raw material | Si/Al ratio (mol/mol) | | | | | | |
|---|---|---|---|---|---|---|---|---|
|  |  | 30 | 45 | 60 | 75 | 100 | 350 | 480 |
| Brending amount (g) | Ion-exchanged water | 151 | 151 | 151 | 151 | 151 | 151 | 151 |
|  | Colloidal silica, (Ludox AS-40) | 36.0 | 36.0 | 36.0 | 36.0 | 36.0 | 36.0 | 36.0 |
|  | Potassium hydroxide | 3.9 | 3.9 | 3.9 | 3.9 | 3.9 | 3.9 | 3.9 |
|  | 1,6-hexanediamine | 8.4 | 8.4 | 8.4 | 8.4 | 8.4 | 8.4 | 8.4 |
|  | Aluminum sulfate 18-hydrate | 2.7 | 1.8 | 1.3 | 1.1 | 0.8 | 0.2 | 0.2 |
|  | ZSM-22 (seed crystal) | 0.1 | 0.1 | 0.1 | 0.1 | 0.1 | 0.1 | 0.1 |

<Evaluation of Catalyst Through Model Reaction Using N-Decane>

A catalyst was manufactured according to the following procedures, and a catalytic ability thereof was evaluated through a model reaction using n-decane.

1. Manufacturing of Catalyst 1-1. Manufacturing of Crystalline Aluminosilicate 1-1-1. Manufacturing ZSM-22

7 Types of crystalline aluminosilicate ZSM-22 having an Si/Al ratio of 30 to 480 were manufactured by hydrothermal syntheses with a feeding raw material composition listed in Table 1 according to a method disclosed in a document (ERNST, S. et al., Appl. Catal. 1989, 48, 137). An example of manufacturing ZSM-22 having an Si/Al ratio of 45 is explained in detail below.

Firstly, 4 types of aqueous solutions were manufactured as follows.

Solution A: a solution obtained by dissolving 3.9 g of potassium hydroxide in 13.5 mL ion-exchanged water.

Solution B: a solution obtained by dissolving 1.8 g of aluminum sulfate 18-hydrate in 10 mL ion-exchanged water.

Solution C: a solution obtained by diluting 8.4 g of 1, 6-hexanediamine (organic template) with 65 mL ion-exchanged water.

Solution D: a solution obtained by diluting 36 g of colloidal silica (Ludox AS-40 manufactured by Grace Davison Co.) with 62 mL ion-exchanged water.

Next, the solution A was added to the solution B, and stirring was performed until an aluminum component was completely dissolved. The solution C was added to the mixed solution. Next, while intensive stirring at a room temperature, the mixture of solutions A, B, and C was poured into the solution D. 0.1 g of powdery ZSM-22 which was separately synthesized and not subjected to any specific treatment was added as a "seed crystal" for accelerating crystallization.

A gel state material obtained according to the aforementioned processes was approximately divided into two por- 1-1-2. Manufacturing of Crystalline Aluminosilicate ZSM-23

A crystalline aluminosilicate ZSM-23 having an Si/Al ratio of 45 was manufactured by a hydrothermal synthesis according to a method of Example 2 disclosed in U.S. Pat. No. 4,490,342.

Firstly, an organic template Diquat-7 (N,N,N,N',N',N'-hexamethyl-1,7-diaminoheptane dibromide) was synthesized by using a method of Example A disclosed in U.S. Pat. No. 4,490,342. Namely, in a round bottom flask, 50 g of 1,7-dibromoheptane and 100 mL of ethanol were mixed, and 70 g of triethylamine (33 wt % ethanol solution) was added thereto while stirring, and the solution was heated and refluxed overnight. The reaction product was cooled with an iced-cold water, and a crystal was extracted by filtration. The crystal was rinsed with diethylether, and dried at a room temperature, so that the desired Diquat-7 (dibromide) was obtained.

ZSM-23 was synthesized through the following processes using the obtained Diquat-7.

Firstly, 2 types of solutions were manufactured as follows.

Solution E: a solution obtained by diluting 15 g of colloidal silica (Ludox HS-40 manufactured by Grace Davison Co.) with 31.6 mL of ion-exchanged water.

Solution F: a solution obtained by mixing 48.3 mL of ion-exchanged water, 0.218 g of sodium aluminate, 1.2 g of sodium hydroxide, 0.9 g of sulfuric acid, and 2.7 g of Diquat-7 salt.

Next, solution F was poured into solution E while stirring. An obtained gel state material was transferred to a stainless steel autoclave reactor having an inner volume of 120 mL. A reaction was performed in an oven at a temperature of 160° C. for 72 hours while the autoclave reactor itself was rotated with a rotation speed of about 60 rpm. After the reaction was ended, the reactor was cooled, and a generated solid content was extracted by filtration, rinsed with an ion-exchanged water, and dried overnight in a drying unit at a temperature of 60° C., so that the ZSM-23 having an Si/Al ratio of 45 was obtained.

1-2. Ion Exchange of Crystalline Aluminosilicate

Each of the synthesized ZSM-22 (Si/Al ratio=30, 45, 60, 75, 100, 350, 480) and ZSM-23 (Si/Al ratio=45) was subjected to the ion exchange in the state that the organic template was contained and the ion exchange after the organic template was removed by the calcination, respectively.

1-2-1. Ion Exchange in the State of Organic Template Existence

Each of the obtained 7 types of powdery ZSM-22 and one type of ZSM-23 was charged into a flask, and 100 mL of 0.5M ammonium chloride aqueous solutions per 1 g of crystalline aluminosilicate was added thereto, and heating and refluxing were performed for 6 hours. The resulting product was cooled down to a room temperature, and upper solution was removed. The crystalline aluminosilicate was rinsed with ion-exchanged water. The same amount of 0.5M ammonium chloride aqueous solutions was added thereto, and heating and circuiting were performed for 12 hours.

Next, the crystalline aluminosilicates was extracted by filtration, rinsed with an ion-exchanged water, and dried overnight in a drying unit at a temperature of 60° C., so that ion-exchanged $NH_4$ type ZSM-22 and ZSM-23 were obtained. In addition, it was confirmed from a thermal-gravity analysis that a portion of the organic template was removed by the ion exchange although this was a qualitative evaluation from an affect of absorbed water.

1-2-2. Ion Exchange after Removal of Organic Template by Calcination

Each of the obtained 7 types of powdery ZSM-22 and one type of ZSM-23 was charged into a quartz tube, heated under a nitrogen stream so as to raise the temperature up to 400° C. with a rate of 5° C./minute, and maintained in the same state for 6 hours. Next, the gas stream was switched to an oxygen gas, and the temperature was raised up to 550° C. with a rate of 5° C./minute and maintained at the temperature overnight. Here, in the nitrogen stream, due to the calcination at a temperature of 400° C., the organic template was decomposed, mainly by elimination of hydrogen, to be transformed into a carbon phase material. Then in the oxygen stream, due to the calcination at a temperature of 550° C., the carbon phase material was oxidized (burned), so that the organic template was removed. In addition, it is considered that, due to the two steps of calcination, influence of steaming with the water generated in the combustion of the organic template can be prevented more efficiently than the case where the calcination is directly performed in the oxygen stream.

Each of the calcined ZSM-22 and ZSM-23 was cooled down to a room temperature, and transferred to flask. 0.5M ammonium chloride aqueous solutions was added thereto, and heating and refluxing were preformed overnight, so that the ion exchange was carried out. After the ion exchange was ended, the solid content was extracted by filtration, rinsed with an ion-exchanged water, and dried in a drying unit at a temperature of 60° C. overnight, so that $NH_4$ type ZSM-22 and ZSM-23 were obtained. These crystalline aluminosilicates were the ones that were subjected to the ion exchange in the state that the organic template was not contained.

The obtained $NH_4$ type ZSM-22 and ZSM-23 which were ion-exchanged in the state that the calcination was not performed to contain the organic template and the obtained $NH_4$ type ZSM-22 and ZSM-23 which were ion-exchanged in the state that the calcination was performed not to contain the organic template are denoted by "$NH_4$-ZSM-22 [45] IE", "$NH_4$-ZSM-22 [45] C-IE" respectively, for example. Here, "$NH_4$—" denotes that the ion exchange is performed into the $NH_4$ type; the number in [ ] denotes an Si/Al ratio; "IE" denotes that the ion exchange is performed in the state that the calcination is not performed to contain the organic template; and "C-IE" denotes that the ion exchange is performed in the state that the calcination is performed not to contain the organic template.

1-2-3. Ion Exchange by Using a Solution with Organic Solvent

According to the invention disclosed in U.S. Pat. No. 5,143,879, in experimental examples 25 to 34 of ion exchange processes by using a solution with organic solvent disclosed in line 61 of column 38 to line 17 of column 41 of the specification, under the following representative conditions, the ion exchange of ZSM-22 [45] containing an organic template was performed.

A solution for ion exchange was manufactured by adding 0.60 g of concentrated hydrochloric acid (37 wt % HCl) in a 100 mL mixture of a heptane and ethanol with a weight ratio of 1:1.

The powdery ZSM-22 [45] synthesized in 1-1-1 was charged into flask, then added thereto the aforementioned solution for the ion exchange at the ratio of 33 mL per 1 g-ZSM-22, and heating and refluxing were performed for one hour. The resulting product was cooled down, and the upper solution was removed, then the same amount of the aforementioned solution for the ion exchange was added again, and the heating and refluxing were performed for one hour. These operations were repeated two times. After that, the resulting product was cooled down to the room temperature, and the solid content was extracted and rinsed with an ion-exchanged water. The resulting product was dried in a drying unit at temperature of 60° C. overnight, so that the ZSM-22 ion-exchanged in an organic solution was obtained. The ZSM-22 ion-exchanged in an organic solution is called "H-ZSM-22 [45] IEO (IEO denotes ion exchange performed in an organic solution).

With respect to the obtained H-ZSM-22 [45] IEO, it was observed from a thermal-gravity analysis thereof that an amount of the remained organic template was substantially equal to that of ZSM-22 before the ion exchange, and the removing of the organic template by the ion exchange did not substantially proceed.

In addition, with respect to the obtained H-ZSM-22 [45] IEO, the aforementioned ZSM-22 [45] C in which the organic template was removed by the calcination and of which ion exchange was not performed, and the aforementioned $NH_4$-ZSM-22 [45] IE of which calcination was not performed and ion exchange was performed in an aqueous solution, an amount of the remained potassium ions, existing as counter ions during the hydrothermal synthesis, was qualitatively measured by an ICP (Inductively Coupled Plasma) method. The results of the measurement were listed in Table 2. It was observed that, in the H-ZSM-22 [45] IEO, the potassium ions were not greatly removed by the ion exchange, but a relatively large amount of the potassium ions were remained in comparison with the $NH_4$-ZSM-22 [45] IE.

TABLE 2

| Zeolite | ZSM-22[45] C | $NH_4$-ZSM-22[45] IE | H-ZSM-22[45] IEO |
|---|---|---|---|
| Amount of Potassium (mg/g) | 2.8 | not detected (<1) | 2.2 |

1-3. Loading of Platinum on Crystalline Aluminosilicate and Molding

The obtained $NH_4$-ZSM-22 [30] IE to $NH_4$-ZSM-22 [480] IE, and $NH_4$-ZSM-23 [45] IE, the obtained $NH_4$-ZSM-22

[30] C-IE to NH$_4$-ZSM-22 [480] C-IE, NH$_4$-ZSM-23 [45] C-IE, and the obtained H-ZSM-22 [45] IEO were subjected to platinum loading and activation by the following method.

Firstly, tretraammine dichloro platinum (II) (Pt(NH$_3$)$_4$Cl$_2$) was dissolved in a minimum amount of ion-exchanged water. The solution was impregnated into each of the aforementioned NH$_4$ type crystalline aluminosilicates by using an initial wetting method to load 0.3 wt % platinum with respect to a weight of the crystalline aluminosilicate. Next, each of the resulting products was dried in a drying unit at a temperature of 60° C. overnight. After that, each of the resulting products was molded into a disk shape by press molding. Then, the disks were crashed coarsely, and sieved, so that an amorphous granular body having a maximum diameter of 125 to 250 µm was obtained.

1-4. Activation of Catalyst 50 mg of each of the obtained platinum-loaded NH$_4$-ZSM-22 [30] IE to NH$_4$-ZSM-22 [480] IE, NH$_4$-ZSM-23 [45] IE, NH$_4$-ZSM-22 [30] C-IE to NH$_4$-ZSM-22 [480] C-IE, NH$_4$-ZSM-23 [45] C-IE, H-ZSM-22 [45] IEO was charged into a stainless steel micro-reactor (described later in detail), and calcined at 400° C. under an oxygen stream for 1 hour. Subsequently, a reduction treatment was performed under a hydrogen stream for 1 hour to activate the catalyst.

Hereinafter, the ZSM-22 and ZSM-23 where the platinum was loaded and the counter ion was changed into proton by the activation process were denoted by, for example, "Pt/H-ZSM-22 [45] IE" and "Pt/H-ZSM-22 [45] C-IE", respectively.

2. Model Reaction Using n-Decane

A catalytic performance of the activated catalysts were evaluated through the model reaction using n-decane.

(Model Reaction Using N-Decane)

[Reaction Apparatus]

The model reaction was performed by using the aforementioned fixed bed type micro-reactor. A reaction tube was a stainless steel tube having an inner diameter of 2.1 mm and a length of 30 mm, and 5 mg catalyst was charged in the lowest portion thereof. Into the micro-reactor, an oxygen gas and a hydrogen gas used for activating the catalyst, a nitrogen gas for purging, and a hydrogen gas including a reaction raw material, that is, n-decane vapor were switched by a valve so as to be supplied. The reaction raw material, that is, n-decane was supplied together with the hydrogen gas into the reactor by flowing the hydrogen gas into an n-decane vapor saturation apparatus which was heated at a predetermined temperature. The reaction is performed in a gas phase. In addition, the reaction product gas was sampled by a sampling value which was disposed at the downstream of the reaction tube and of which pressure was controlled. The reaction product gas was transferred to a gas chromatography (GC) apparatus to which a multi-capillary column with a dimethylpolysiloxane as a fixed phase was provided, and it was automatically analyzed.

In the reaction apparatus, with respect to the activation of the catalyst and the n-decane isomerization reaction, a series of operations such as gas selection, gas flow rate, reaction temperature, valve selection, sampling of reaction product, and operations of the GC were performed according to a previously input sequence. As basic operations, a process of activating the catalyst charged in the reaction tube was performed at a temperature of 400° C., and purging of the system was performed with the nitrogen gas. After the temperature of the reaction tube was changed to 150° C., the hydrogen gas including the n-decane vapor was introduced, and the isomerization reaction was started. After 1 hour, the reaction product gas was sampled and analyzed. The reaction temperature was then changed to 160° C., and after 1-hour stabilization, the reaction product gas was sampled and analyzed. Subsequently, while the reaction temperature was raised by 10° C. step by step, up to the reaction temperature of 300° C., the stabilization and the analysis of the reaction product were repeatedly performed.

[Reaction Conditions]

The n-decane isomerization reaction in the presence of the hydrogen was performed under the following conditions.

Raw material n-decane: reagent (purity 99% or more) used without purification.

Reaction pressure: 0.45 MPa.

Hydrogen/n-decane ratio: 375 mol/mol.

Reaction temperature: 150 to 300° C., raised by 10° C.

Results of n-decane conversion (%), mono-branched C10 isomer yield (%), di-branched C10 isomer yield (%), total C10 isomer yield (%), and cracking product (C9 or less) yield (wt %) obtained by the model reaction using n-decane are listed in Tables 3 to 5.

TABLE 3

| Catalyst Pt/H-ZSM-22 [45] | IE | C-IE | IE | C-IE | IE | C-IE |
|---|---|---|---|---|---|---|
| Reaction temperature (° C.) | 220 | 220 | 250 | 250 | 300 | 300 |
| n-Decane conversion (wt %) | 87.8 | 88.4 | 94.0 | 96.5 | 99.1 | 99.9 |
| Mono-branched C10 isomer yield (wt %) | 74.3 | 69.8 | 48.0 | 31.6 | 6.6 | 1.2 |
| Di-branched C10 isomer yield (wt %) | 9.1 | 7.2 | 21.4 | 13.1 | 7.6 | 2.4 |
| Total C10 isomer yield (wt %) | 83.4 | 77.0 | 68.9 | 44.7 | 14.2 | 3.6 |
| Cracking product (C9 or less) yield (wt %) | 4.4 | 11.4 | 24.6 | 51.9 | 84.9 | 96.4 |

As listed in Table 3, it can be observed that the catalysts (IE) that were synthesized by performing the ion exchange in the state that the calcination was not performed to contain the organic template have a high mono-branched isomer yield, a high di-branched isomer yield, and a low cracking product yield in any reaction temperature of 220 to 300° C. in comparison with the catalysts (C-IE) that were manufactured by performing the ion exchange in an aqueous solution in the state that the calcination was performed not to contain the organic template.

In addition, the composition of the cracking products (cracking product yield of 24.6 wt %) that were obtained at a reaction temperature of 250° C. by using the Pt/H-ZSM-22 [45] IE as a catalyst and the composition of the cracking products (cracking product yield of 21.2 wt %) that were obtained at a reaction temperature of 230° C. by using the Pt/H-ZSM-22 [45] C-IE as a catalyst were analyzed. The results are illustrated in FIGS. 1 and 2.

Figure 2:
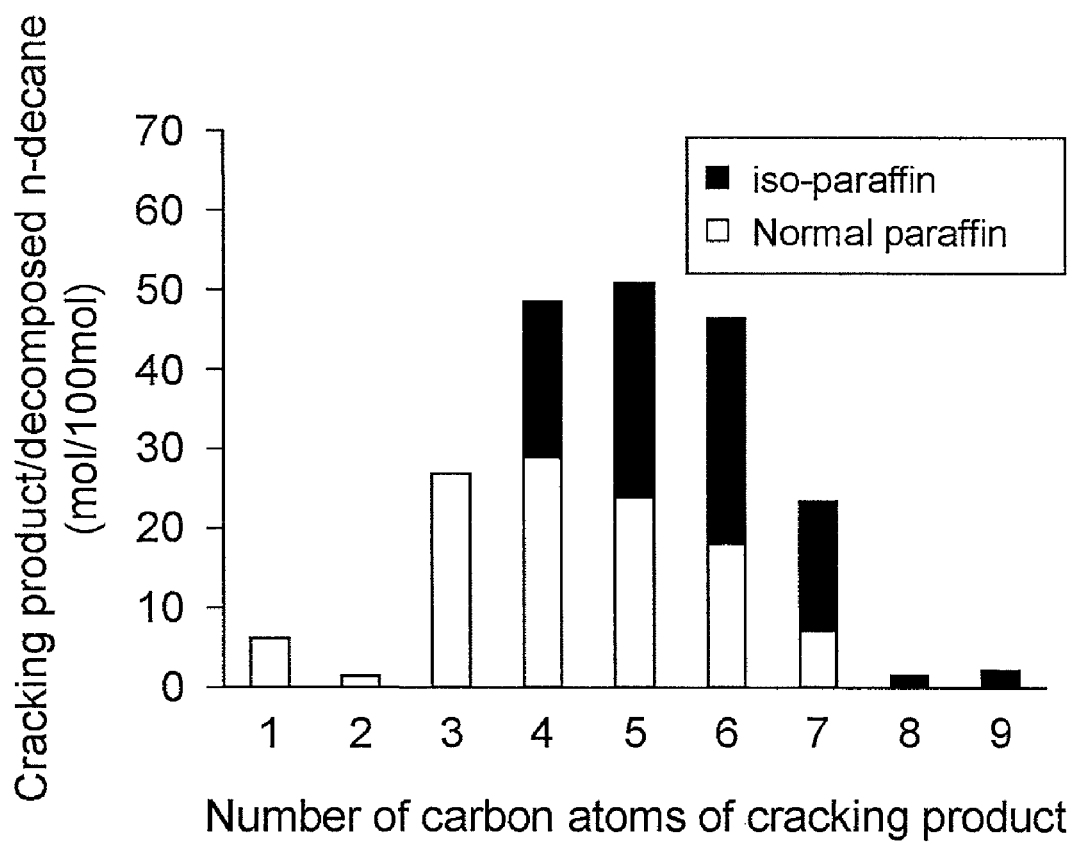
FIG. 2 is a graph illustrating a composition of a cracking products.

FIG. 1 is a graph illustrating the composition of the cracking products obtained by using the Pt/H-ZSM-22 [45] C-IE. FIG. 2 is a graph illustrating the composition of the cracking products obtained by using the Pt/H-ZSM-22 [45] IE. In the figures, the horizontal axes indicates the number of carbon atoms of the cracking product, and the vertical axes indicates a mole number of the cracking product having each number of carbon atoms per 100 mol of the cracked n-decane. It can be clarified from FIGS. 1 and 2 that the ratio of iso-paraffin in the cracking product obtained by using the Pt/H-ZSM-22 [45] IE is increased in comparison with that of the cracking product obtained by using the Pt/H-ZSM-22 [45] C-IE.

It can be considered from the results that, in case of using the catalyst manufactured by using the conventional method, a relatively large amount of n-decane is cracked, but in case of using the catalyst according to the present invention, the n-decane isomerization is performed in priority, so that the isomers are considered to be further cracked. In addition, it can be considered, from the fact that the cracking product contains a large amount of the hydrocarbon having a branched chain structure, that in case of manufacturing the lube-oil base oil and the gas oil base oil simultaneously by using the catalyst according to the present invention, the cold flow property of the gas oil base oil can be improved, and such a gas oil base oil can be obtained with a high yield.

TABLE 4

| | Si/Al ratio of Catalyst Pt/H-ZSM-22 [ ] IE | | | | | | |
|---|---|---|---|---|---|---|---|
| | 30 | 45 | 60 | 75 | 100 | 350 | 480 |
| n-Decane conversion (wt %) | 92.0 | 87.8 | 87.7 | 87.6 | 88.1 | 35.6 | 8.0 |
| Mono-branched C10 isomer yield (wt %) | 62.3 | 74.3 | 76.1 | 77.2 | 76.9 | 29.4 | 7.5 |
| Di-branched C10 isomer yield (wt %) | 14.6 | 9.1 | 7.6 | 6.5 | 6.7 | 1.7 | 0.1 |
| Total C10 isomer yield (wt %) | 76.3 | 83.4 | 83.7 | 83.7 | 83.6 | 31.1 | 7.6 |
| Cracking product (C9 or less) yield (wt %) | 15.7 | 4.4 | 4.0 | 3.9 | 4.5 | 4.5 | 0.4 |

As listed in Table 4, in case of the catalyst that is manufactured by performing the ion exchange in an aqueous solution in the state that the ZSM-22 is not calcined to contain the organic template, the n-decane conversion and the isomer yield associated with the ZSM-22 having an Si/Al ratio of 30 to 350 tend to be higher than those of ZSM-22 having an Si/Al ratio of 480.

TABLE 5

| Catalyst Pt/H-ZSM-23 [45] | IE | C-IE | IE | C-IE |
|---|---|---|---|---|
| Reaction temperature (° C.) | 220 | 210 | 270 | 240 |
| n-Decane (wt %) | 79.4 | 90.7 | 95.1 | 98.4 |
| Mono-branched C10 isomer yield (wt %) | 70.0 | 65.2 | 35.9 | 20.2 |
| Di-branched C10 isomer yield (wt %) | 5.2 | 2.7 | 18.7 | 8.8 |
| Total C10 isomer yield (wt %) | 75.2 | 67.9 | 54.6 | 29.0 |
| Cracking product (C9 or less) yield (wt %) | 4.2 | 22.8 | 40.5 | 69.4 |

As listed in Table 5, in a case where the catalyst is manufactured from the ZSM-23 having an Si/Al ratio of 45, there is a large difference of catalytic performance between the catalyst (IE) that is manufactured by performing the ion exchange in the state that the ZSM-23 is not calcined to contain the organic template and the catalyst (C-IE) that is manufactured by performing the ion exchange in the state that the ZSM-23 is calcined not to contain the organic template. Namely, it can be observed that the Pt/H-ZSM-23 [45] IE has a high isomerization activity as well as a low cracking activity with a high level in comparison with the Pt/H-ZSM-23 [45] C-IE In addition, in the model reaction using the n-decane, the constraint index CI° defined as follows was obtained from the 2-methylnonane yield and the 5-methylnonane yield. The results are listed in Table 6.

Constraint Index CI°: a mol ratio of 2-methylnonane to 5-methylnonane generated when an iso-decane yield is 5 wt %.

In addition, the model reaction was performed under the conditions, reaction pressure: 0.45 MPa, WHSV: 2530 kg*s/L, hydrogen/n-decane ratio: 375 mol/mol, and the iso-decane yield was changed according to a change in reaction temperature.

TABLE 6

| Catalyst | | CI° |
|---|---|---|
| Pt/H-ZSM-22 [30] | IE | 14.3 |
| | C-IE | 9.8 |
| Pt/H-ZSM-22 [45] | IE | 15.0 |
| | C-IE | 8.3 |
| Pt/H-ZSM-22 [60] | IE | 15.4 |
| | C-IE | 7.7 |
| Pt/H-ZSM-22 [75] | IE | 12.4 |
| | C-IE | 8.7 |
| Pt/H-ZSM-23[45] | IE | 4.5 |
| | C-IE | 3.7 |

As listed in Table 6, it can be observed that, in any one of the 4 types of ZSM-22 having different Si/Al ratio and ZSM-23, the catalyst (IE) that is manufactured by performing the ion exchange in the state the crystalline aluminosilicate is not calcined to contain the organic template has a small CI°, that is, increases a ratio of generating the isomers where a position of the branched chain exists in an inner position of the main chain in comparison with the catalyst (C-IE) that is manufactured by performing the ion exchange in the state the crystalline aluminosilicate is calcinated not to contain the organic template.

With respect to the catalyst composed of ZSM-22 [45] IEO subjected to the ion exchange in a solution using an organic solvent and the catalyst composed of ZSM-22 [45] IE subjected to the ion exchange in an aqueous solution, the model reaction using n-decane were performed by using the same operations as the aforementioned operations. The results are listed in Table 7.

TABLE 7

| Catalyst Pt/H-ZSM-22 [45] | IE | IEO | IE | IEO | IE | IE |
|---|---|---|---|---|---|---|
| Reaction temperature (° C.) | 180 | 180 | 190 | 190 | 240 | 240 |
| n-Decane conversion(wt %) | 66.1 | 50.0 | 87.0 | 86.1 | 98.0 | 96.7 |
| C10 isomer yield (wt %) | 62.5 | 46.6 | 81.3 | 78.1 | 38.4 | 19.5 |
| Cracking product (C9 or less) yield (wt %) | 3.6 | 3.4 | 5.7 | 8.0 | 59.5 | 77.2 |

As shown in Table 7, in comparison with Pt/H-ZSM-22 [45] IE, the Pt/H-ZSM-22 [45] IEO has a tendency to have a low activity at a low reaction temperature and a low isomerization selectivity at a high reaction temperature.

Figure 4:
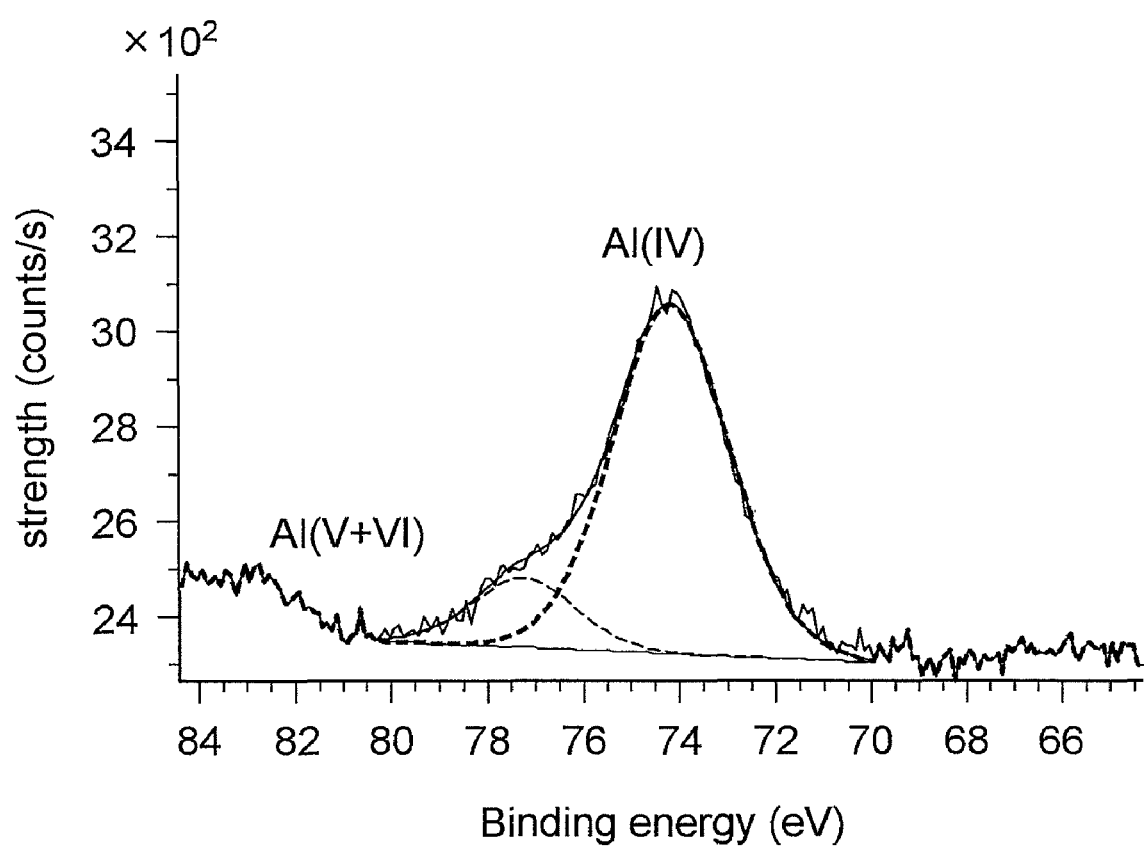
FIG. 4 is an XPS spectrum of 2p orbit region of aluminum atom of a crystalline aluminosilicate.
Figure 5:
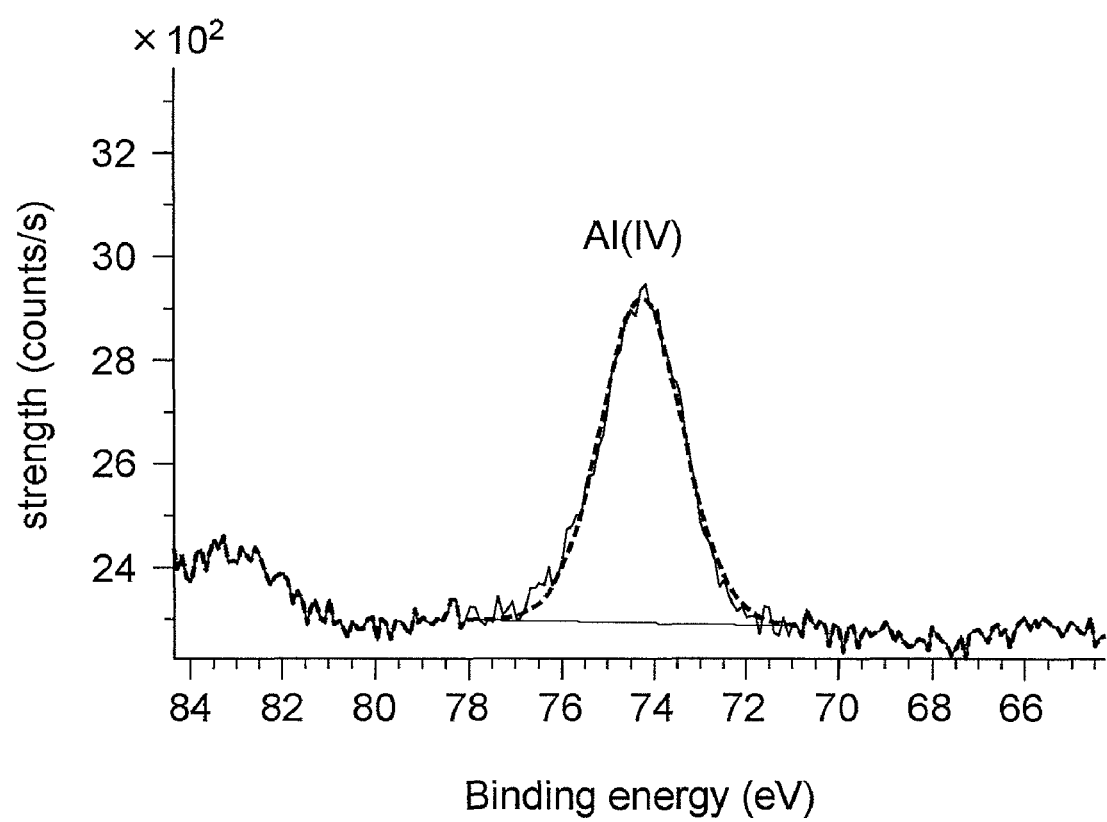
FIG. 5 is an XPS spectrum of 2p orbit region of aluminum atom of a crystalline aluminosilicate.

3. Analysis of Structures of Crystalline Aluminosilicate and Catalyst 3-1. XPS Analysis of Crystalline Aluminosilicate The ZSM-22 [45] (non-ion-exchange product), the NH$_4$-ZSM-22 [45] IE, and the NH$_4$-ZSM-22 [45] C-IE were subjected to an XPS analysis. As an analytical instrument, Kratos Axis Ultra spectrometer of Kratos Analytical Co. was used. The obtained XPS spectra are illustrated in FIGS. 3 to 5.

Figure 3:
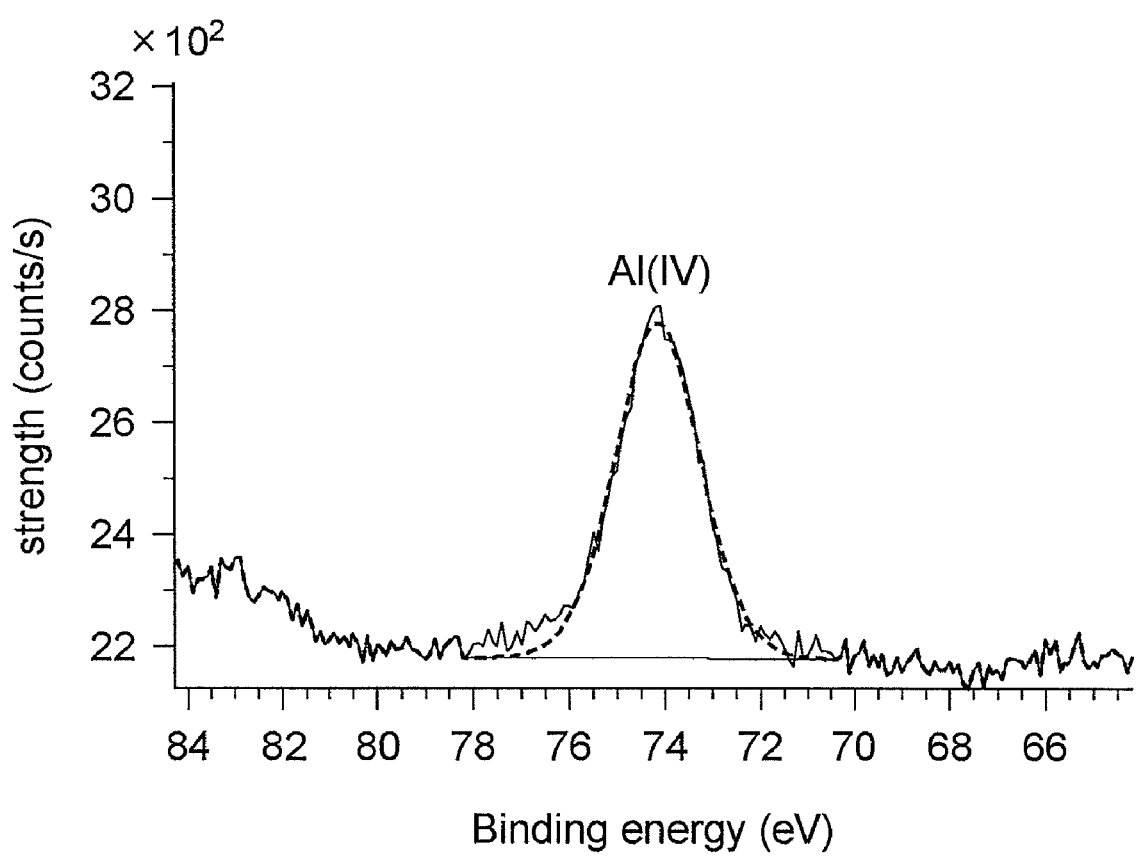
FIG. 3 is an XPS spectrum of 2p orbit region of aluminum atom of a crystalline aluminosilicate.

FIG. 3 is an XPS spectrum of 2p orbit region of aluminum atom in the ZSM-22 [45] (non-ion-exchange product). FIG. 4 is an XPS spectrum of 2p orbit region of aluminum atom in the NH$_4$-ZSM-22 [45] C-IE. FIG. 5 is an XPS spectrum of 2p orbit region of aluminum atom in the NH$_4$-ZSM-22 [45] IE.

In the spectrum of the ZSM-22 [45], an approximately single signal is observed in the vicinity of 74.3 eV assigned to Al (IV), and in the spectrum of the NH$_4$-ZSM-22 [45] IE, approximately the same signal is observed. On the other hand, in the spectrum of the NH$_4$-ZSM-22 [45] C-IE, a signal of 74.3 eV is additionally observed, and another signal is observed in the vicinity of 77.3 eV. The signal in the vicinity of 77.3 eV is assigned to Al (V) or Al (VI) which exists in a region out of the skeleton of the zeolite. Concerning the spectrum, curve fitting using a Gaussian/Lorentzian (=7/3) composite function was applied and a ratio of the Al (V) and/or the Al (VI) that exist in a region out of the skeleton of the zeolite was estimated based on a ratio of areas of the two signals. As a result, the ratio of the aforementioned Al (V) and/or the Al (VI) was about 15% with respect to the total number of aluminum atoms in the zeolite.

In addition, with respect to the ZSM-22 [60], the ZSM-22 [75], and the ZSM-23 [45], the same comparison of the XPS spectra was performed. As a result, the same difference between the IE and the C-IE were observed.

In addition, an Si/A ratio for crystal surface was obtained from the results of the XPS analyses of the ZSM-22 [45], the $NH_4$-ZSM-22 [45] C-IE, and the $NH_4$-ZSM-22 [45] IE. The results are listed in Table 8. In addition, in comparison with an Si/Al ratio for the whole crystal of the crystalline aluminosilicate, the Si/Al ratio for crystal surface generally tends to has a low value (have a high Al content).

TABLE 8

| Crystalline aluminosilicate | ZSM-22 [45] | $NH_4$-ZSM-22 [45] C-IE | $NH_4$-ZSM-22 [45]IE |
|---|---|---|---|
| Surface Si/Al ratio | 30.0 | 17.2 | 31.6 |
| Al(IV) (%) | 100 | 85 | 100 |
| Al(V + VI) (%) | 0 | 15 | 0 |

As listed in Table 8, it is clarified from the results of analyses in view of the aluminum atoms constituting the skeleton that $NH_4$-ZSM-22 [45] C-IE has a different structure from that of crystalline aluminosilicate as hydrothermally synthesized.

Figure 6:
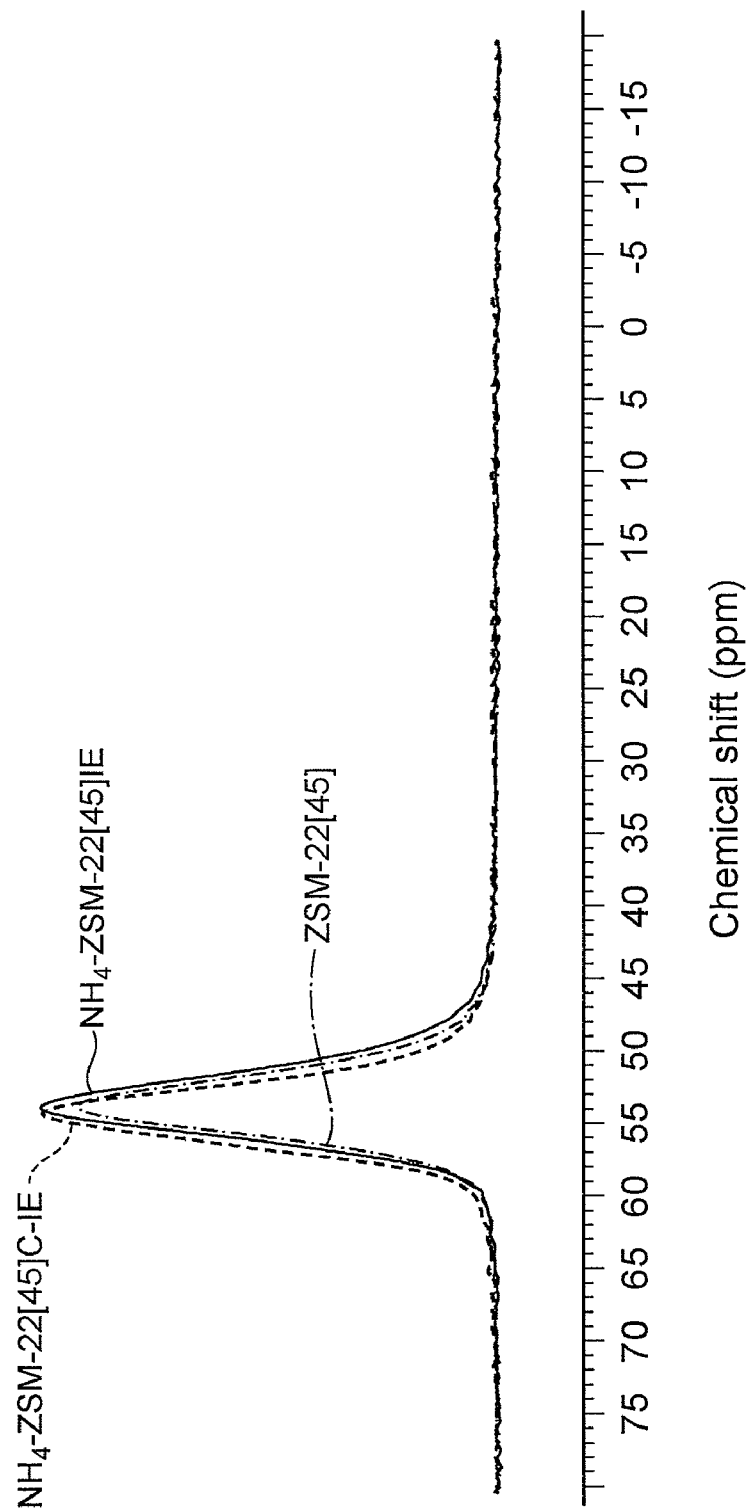
FIG. 6 is a $^{27}$Al magic angle spinning (MAS) NMR spectrum of a crystalline aluminosilicate.

3-2. $^{27}$Al Magic Angle Spinning (MAS) NMR Analysis of Crystalline Aluminosilicate The ZSM-22 [45] (non-ion-exchange product), the $NH_4$-ZSM-22 [45] IE, and the $NH_4$-ZSM-22 [45] C-IE were subjected to a $^{27}$Al magic angle spinning (MAS) NMR analysis. As an analytical instrument, DSX400 spectrometer of Bruker was used. The obtained XPS spectra are illustrated in FIG. 6.

In the spectrum of the ZSM-22 [45], a signal is observed in the vicinity of a chemical shift of 54 ppm, and in the spectrum of the $Na_4$-ZSM-22 [45] IE, approximately the same signal is observed. On the other hand, in the spectrum of the $NH_4$-ZSM-22 [45] C-IE, a signal is observed in a position shifted by about 1 ppm toward a low magnetic field, and a width of the signal is narrowed in comparison with the ZSM-22 [45]. As described above, since the aluminum atoms of the ZSM-22 may exist at different T sites, generally, such a signal may be considered to be combined into a single signal in the observation of NMR spectrum. In $NH_4$-ZSM-22 [45] C-IE, the change in the chemical shift at the top position of the signal may be considered to represent that the ratio of aluminum atoms existing at different T sites is changed. In addition, the narrowed width of the signal may be considered to represent that shilding effect of a resonance frequency becomes weak.

Accordingly, it may be understood from the results of the analyses of aluminum using XPS and $^{27}$Al MAS NMR that the NIL-ZSM-22 [45] IE obtained by performing the ion exchange in the state that the crystalline aluminosilicate is not calcined to contain the organic template have a structure similar to that of the ZSM-22 [45] as hydrothermally synthesized, and the $NH_4$-ZSM-22 [45] IE obtained by performing the ion exchange in the state that the crystalline aluminosilicate is calcined not to contain the organic template have a different structure.

3-3. XPS Analysis of Catalyst After Activation

The Pt/H-ZSM-22 [45] C-IE and the Pt/H-ZSM-22 [45] IE obtained by loading of platinum and activation were subjected to XPS analyses in the same manner described above. The obtained XPS spectra are illustrated in FIGS. 7 and 8.

Figure 7:
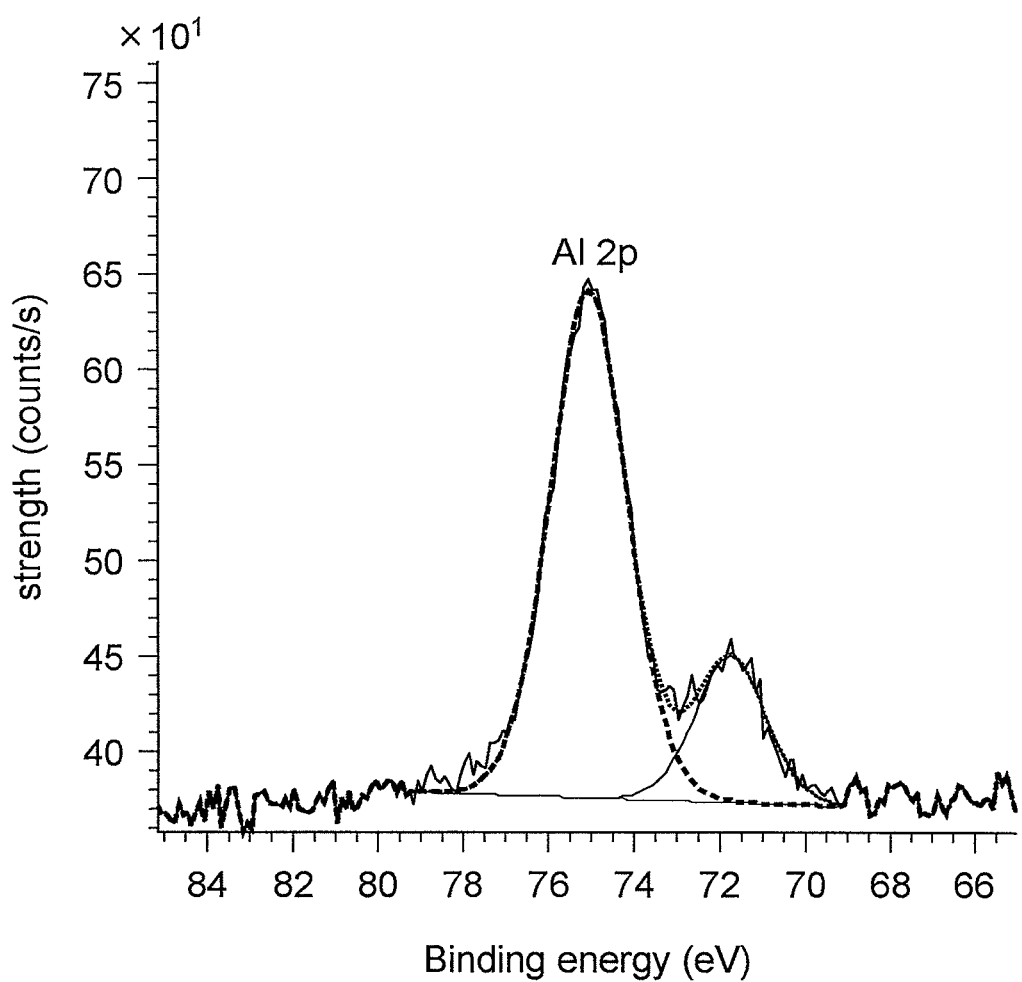
FIG. 7 is an XPS spectrum of 2p orbit region of aluminum atom of a crystalline aluminosilicate.
Figure 8:
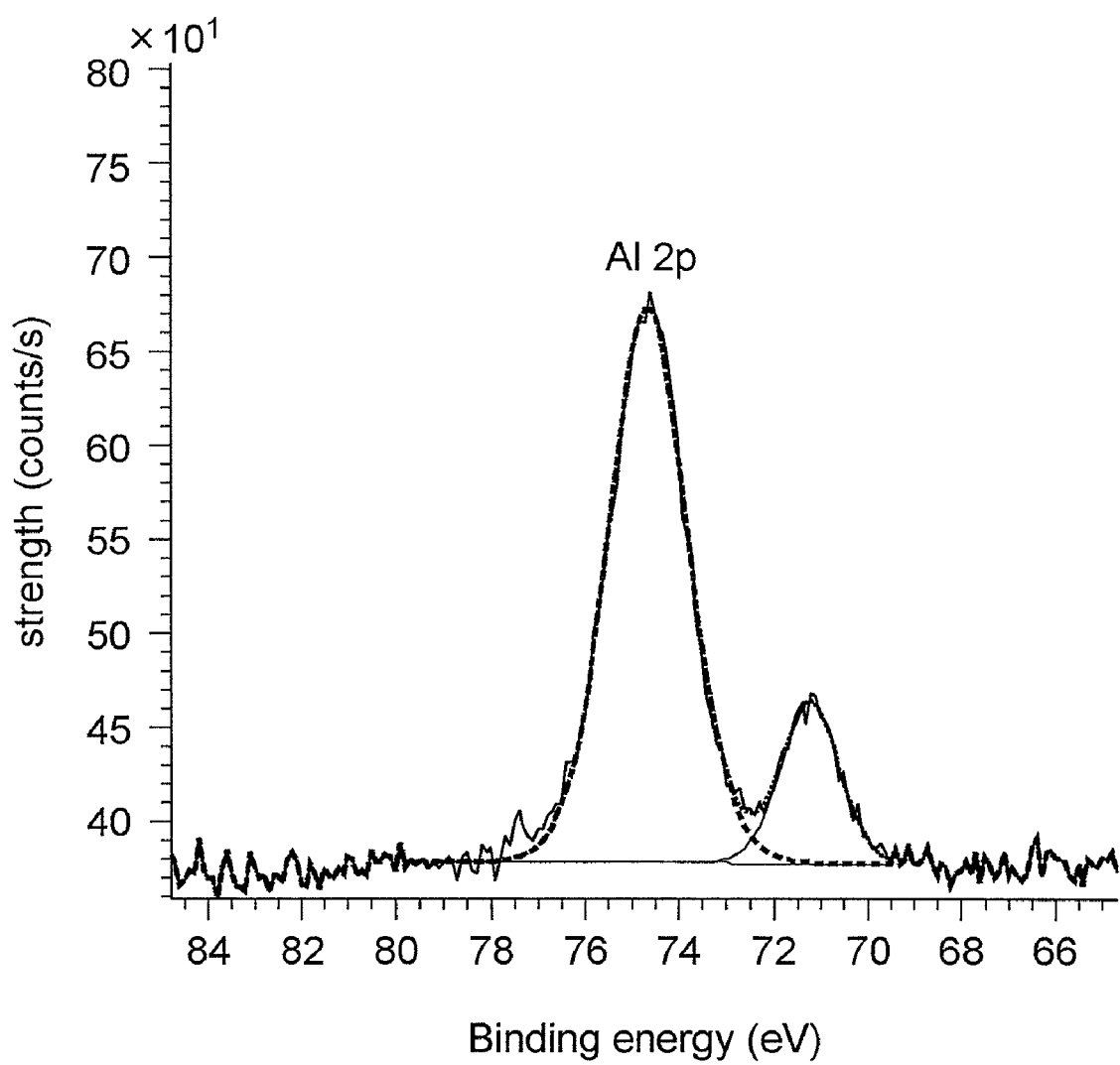
FIG. 8 is an XPS spectrum of 2p orbit region of aluminum atom of a crystalline aluminosilicate.

FIG. 7 is an XPS spectrum of 2p orbit region of aluminum atom in the Pt/H-ZSM-22 [45] C-IE. FIG. 8 is an XPS spectrum of 2p orbit region of aluminum atom in the Pt/H-ZSM-22 [45] IE. There observed no large difference between the two spectra.

As can be seen from the aforementioned model reactions using n-decane, the catalyst according to the present invention has a excellent performance in comparison with the catalyst manufactured by the conventional method. However, a relationship between the good catalyst performance and the structure of the ion-exchanged molecular sieve constituting the catalyst according to the present invention has not yet been clarified. However, it can be considered that, in case of the conventional catalyst that is obtained by performing the ion exchange after the organic template is removed from the crystalline aluminosilicate by the calcination, a portion of the aluminum atoms is moved from an inner portion of the crystal to a surface thereof, and Al (V) and/or Al (VI) are generated on the crystal surface, so that deformation is formed. On the contrary, it can be consider that, in case of the catalyst according to the present invention, since the ion exchange is performed in the state that the crystalline aluminosilicate contains the organic template, such a change in structure does not occur, so that the structure of the molecular sieve during the ion exchange influences the performance of the activated catalyst.

Figure 9:
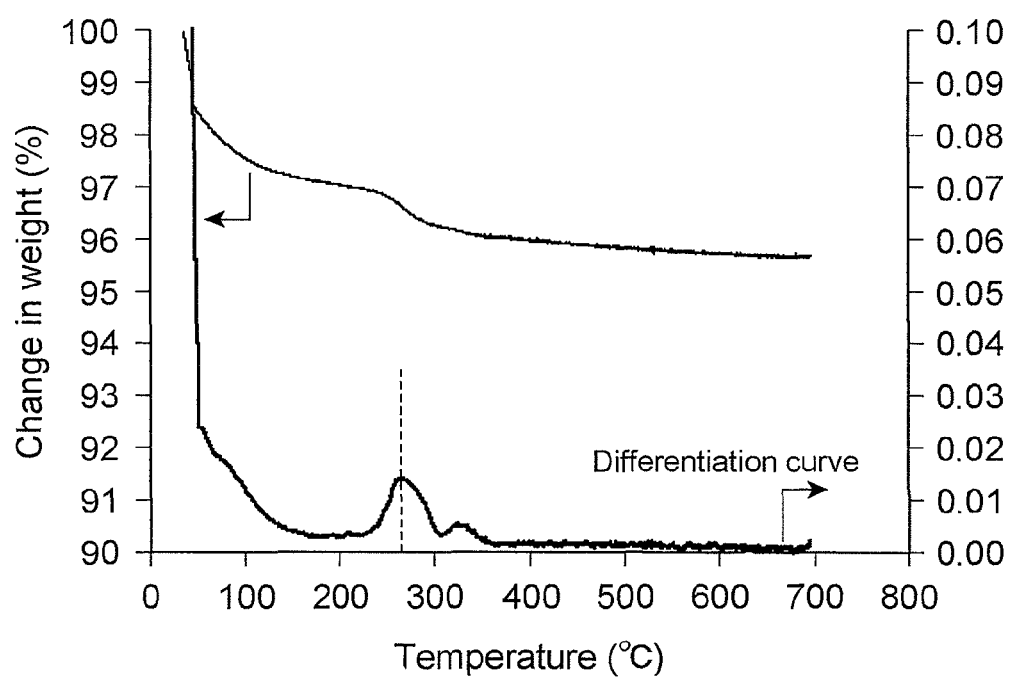
FIG. 9 is a graph illustrating a change in weight of a crystalline aluminosilicate.
Figure 10:
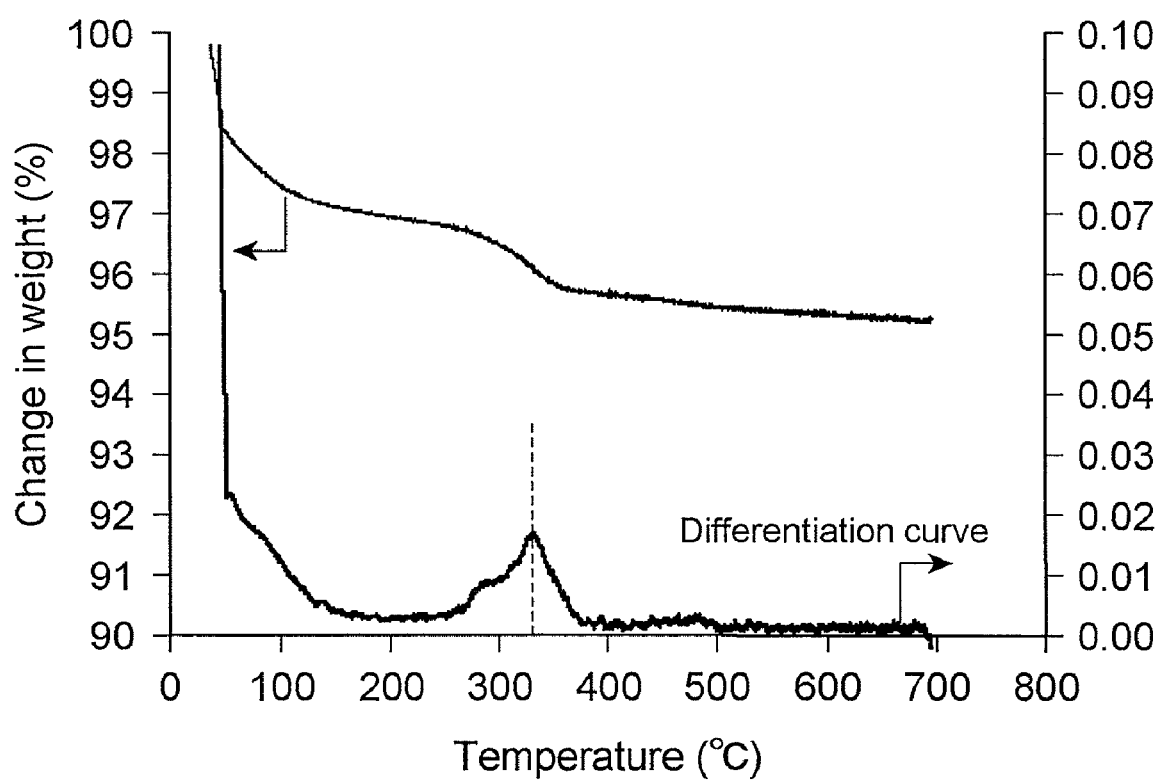
FIG. 10 is a graph illustrating a change in weight of a crystalline aluminosilicate.

3-4. TG Analysis after the Activated Catalyst is Subjected to Ammonium Ion Exchange Again The Pt/H-ZSM-22 [45] C-IE and the Pt/H-ZSM-22 [45] IE obtained by performing platinum loading and activation in 0.5M ammonium chloride aqueous solution were heated and refluxed overnight and subjected to ion exchange, so that the $NH_4$ type Pt/$NH_4$-ZSM-22 [45] C-IE and Pt/$NH_4$-ZSM-22 [45] IE were obtained. A thermal-gravity (TG) analysis was performed on the resulting products. As the analytical instrument, Q500 TGA manufactured by TA Instruments Co. was used, in which the temperature was raised by a rate of 2° C./minute in a nitrogen stream. The obtained graphs of a change in weight are illustrated in FIGS. 9 and 10. FIG. 9 is a graph illustrating a change in weight of the Pt/$NH_4$-ZSM-22 [45] C-IE, and FIG. 10 is a graph illustrating a change in weight of the Pt/$NH_4$-ZSM-22 [45] IE.

As shown in FIGS. 9 and 10, it can be observed from the results of the TG analyses that, in the Pt/$NH_4$-ZSM-22 [45] IE, the elimination of ammonia occurs at a higher temperature in comparison with Pt/$NH_4$-ZSM-22 [45] C-IE. Accordingly, it can be considered that the Pt/$NH_4$-ZSM-22 [45] IE has a Brownsted acid sites with a higher acidity in comparison with the Pt/$NH_4$-ZSM-22 [45] C-IE.

Dewaxing of Wax

Example 1

(Manufacturing of Catalyst)

Silica as a molding binder was added to the $NH_4$-ZSM-22 [45] IE that was manufactured in the aforementioned method at a weight ratio of ZSM-22/silica of 70/30. In addition, a small amount of water was added thereto and sufficiently mixed in a mortar. The obtained mixture was charged into an extrusion molding apparatus to be molded into a cylindrical shape having a diameter of about 1.5 mm and a length of about 5 mm. The molded body was dried in drying unit at 120° C. under air stream for 3 hours and, subsequently, calcined in an electric furnace at 550° C. in the atmospheric ambience for 3 hours.

Then, tetraamminedichloro platinum (II) (Pt $(NH_3)_4Cl_2$) was dissolved in a minimum amount of ion-exchanged water and the solution was impregnated in the obtained molded body by an initial wetting method to load 0.3 wt % platinum with respect to a weight of the crystalline aluminosilicate. Next, the resulting product was dried in a drying unit at 60° C. overnight. After that, the resulting product was calcined in an electric furnace at 550° C. in the atmospheric ambience for 3 hours, so that a molded catalyst precursor containing the Pt/H-ZSM-22 [45] IE was obtained.

(Dewaxing of Wax)

The obtained molded catalyst precursor was charged into a stainless steel reaction tube having an inner diameter of 15 mm and a length of 380 mm, and the reduction process was performed at a catalyst-layer average temperature of 350° C. under hydrogen stream (fractional pressure of hydrogen: 3 MPa) for 12 hours. After that, a wax composed of hydrocarbon (carbon number distribution: C21 to C38; an initial boiling point of 300 to 400° C., a 50% distillate point of 400 to 500° C., and a final distillate point of 500° C. or higher; a weight ratio of the normal paraffins to the total weight of wax of 94 wt %) as a feedstock was fed to start the isomerization reaction in the presence of hydrogen under the conditions of reaction temperature 200° C., fractional pressure of hydrogen 3 MPa, LHSV 2.0 $h^{-1}$, and the hydrogen/oil ratio 592 NL/L. The reaction was performed for 72 hours, and after that, the reaction product was sampled and analyzed.

Then, while the condition for the fractional pressure of hydrogen, the LHSV, and the hydrogen/oil ratio were maintained, the reaction temperature was raised step by step up to about 350° C., so that the conversion of the feedstock oil was increased. At each of the reaction temperatures, the reaction was performed for 72 hours for stabilization, the reaction product was sampled and analyzed.

Figure 11:
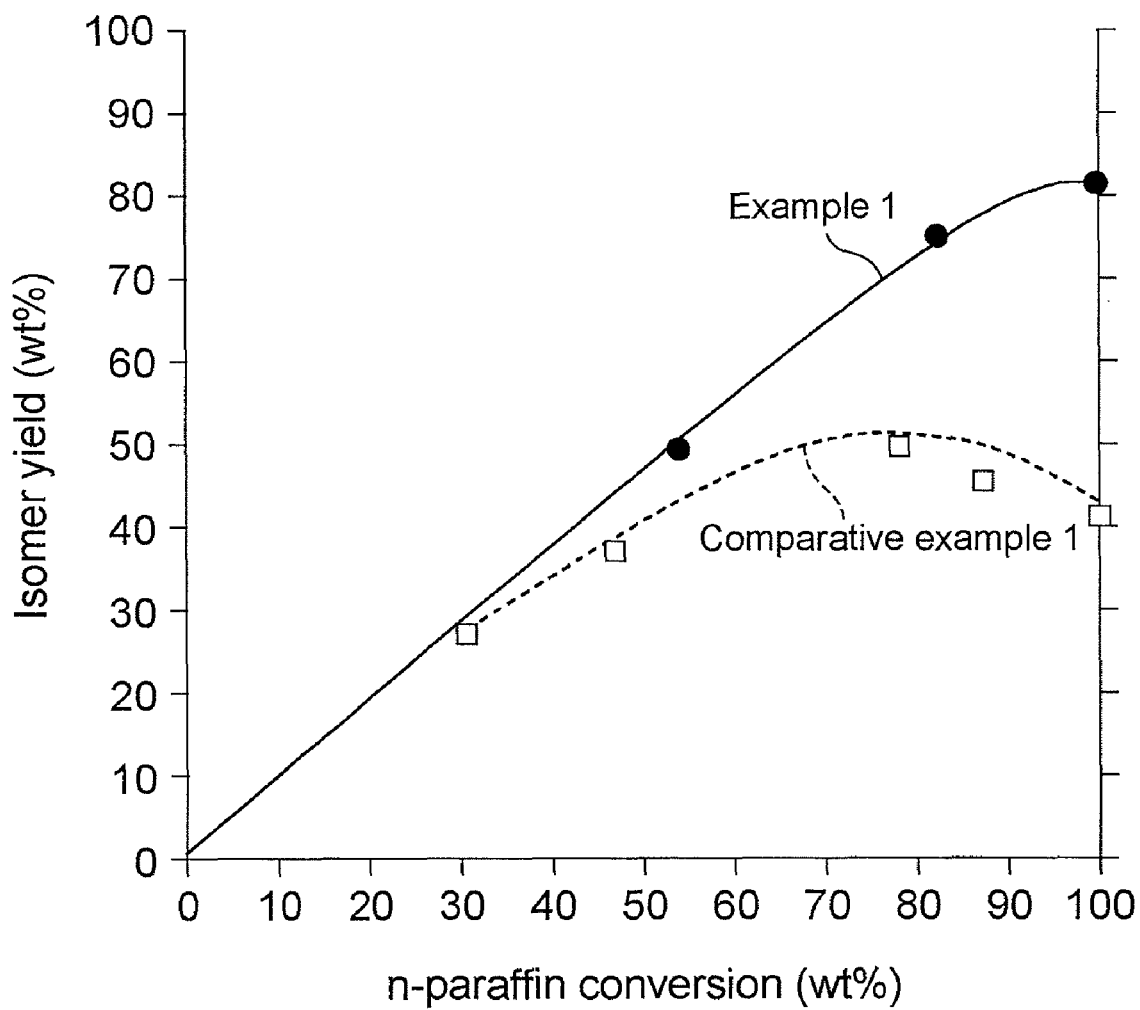
FIG. 11 is a graph illustrating a relationship between a normal paraffin conversion and a yields of isomers.

Based on the results of analyses of the reaction products, the normal paraffin conversion are plotted along the horizontal axis, and the yields of the isomer having branched chains are plotted along the vertical axis. The graph is illustrated in FIG. 11.

In the aforementioned wax isomerization reaction, the normal paraffin conversion in the feedstock wax at a reaction temperature of 330° C. was 100%, and the all components of the carbon number of 21 or more in the resulting product were iso-paraffins. In addition, by performing fractional distillation of the obtained reaction product, lube-oil base oils corresponding to SAE-10 and 70 Pale were obtained. In the properties of the base oils, the lube-oil base oil corresponding to SAE-10 had a kinetic viscosity of 3.987 cSt at a temperature of 100° C., a viscosity index of 142, a pour point of −25° C., and a base oil yield of 35.6 wt % with respect to the feedstock oil, and the lube-oil base oil corresponding to 70 Pale had a kinetic viscosity of 2.71 cSt at a temperature of 100° C. and a base oil yield of 35.0 wt % with respect to the feedstock oil.

Example 2

Manufacturing of Catalyst

A catalyst containing Pt/H-ZSM-23 [45] IE was manufactured by using the same procedures as those of Example 1 except the $NH_4$-ZSM-23 [45] IE manufactured by using the aforementioned method was used instead of the $NH_4$-ZSM-22 [45] IE.

(Dewaxing of Wax)

The isomerization reaction of the wax was performed in the presence of hydrogen of the wax by using the same procedures as those of Example 1 except that the molded catalyst precursor containing Pt/H-ZSM-23 [45] IE was used instead of the molded catalyst precursor containing Pt/H-ZSM-22 [45] IE as a catalyst precursor. The conversion of the normal paraffins in the wax at a reaction temperature of 340° C. was 100%, and the all components of the carbon number of 21 or more in the resulting product were isoparaffins. In addition, by performing fractional distillation of the obtained reaction product, lube-oil base oils corresponding to SAE-10 and 70 Pale were obtained. In the properties of the base oils, the lube-oil base oil corresponding to SAE-10 had a kinetic viscosity of 3.968 cSt at a temperature of 100° C., a viscosity index of 150, a pour point of −22.5° C., and a base oil yield of 38.2 wt % with respect to the feedstock oil, and the lube-oil base oil corresponding to 70 Pale had a kinetic viscosity of 2.70 cSt at a temperature of 100° C. and a base oil yield of 37.3 wt %.

Comparative Example 1

Manufacturing of Catalyst

A molded catalyst precursor containing the Pt/H-ZSM-22 [45] C-IE was manufactured by using the same procedures as those of manufacturing the catalyst of Example 1 except that the $NH_4$-ZSM-22 [45] C-IE, manufactured by using the aforementioned method was used instead of the $NH_4$-ZSM-22 [45] IE.

(Dewaxing of Wax)

The isomerization reaction of the wax was performed in the presence of hydrogen of the wax by using the same procedures as those of Example 1 except that the molded catalyst precursor containing Pt/H-ZSM-22 [45] C-IE, was used instead of the molded catalyst precursor containing Pt/H-ZSM-22 [45] IE as a catalyst precursor. The reaction product was analyzed in the same manner as Example 1 and the obtained results is illustrated in FIG. 11. The conversion of the normal paraffins in the wax at a reaction temperature of 340° C. was 100%, and the all components of the carbon number of 21 or more in the resulting product were isoparaffins. In addition, by performing fractional distillation of the obtained reaction product, lube-oil base oils corresponding to SAE-10 and 70 Pale were obtained. In the properties of the base oils, the lube-oil base oil corresponding to SAE-10 had a kinetic viscosity of 3.974 cSt at a temperature of 100° C., a viscosity index of 142, a pour point of −22.5° C., and a base oil yield of 20.0 wt % with respect to the feedstock oil, and the lube-oil base oil corresponding to 70 Pale had a kinetic viscosity of 2.70 cSt at a temperature of 100° C. and a base oil yield of 16.0 wt %.

Comparative Example 2

Manufacturing of Catalyst

A molded catalyst precursor containing the Pt/H-ZSM-23 [45] C-IE was manufactured by using the same procedures as those of manufacturing the catalyst of Example 1 except that the $NH_4$-ZSM-23 [45] C-IE manufactured by using the aforementioned method was used instead of the $NH_4$-ZSM-22 [45] IE.

(Dewaxing of Wax)

The isomerization reaction of the wax was performed in the presence of hydrogen of the wax by using the same procedures as those of Example 1 except that the molded catalyst precursor containing Pt/H-ZSM-23 [45] C-IE was used instead of the molded catalyst precursor containing Pt/H-ZSM-22 [45] IE as a catalyst precursor. The conversion of the normal paraffins in the wax at a reaction temperature of 340° C. was 100%, and the all components of the carbon number of 21 or more in the resulting product were isoparaffins. In addition, by performing fractional distillation of the obtained reaction product, lube-oil base oils corresponding to SAE-10 and 70 Pale were obtained. In the properties of the base oils, the lube-oil base oil corresponding to SAE-10 had a kinetic viscosity of 3.920 cSt at a temperature of 100° C., a viscosity index of 146, a pour point of −22.5° C., and a base oil yield of 26.0 wt % with respect to the feedstock oil, and the lube-oil base oil corresponding to 70 Pale had a kinetic viscosity of 2.68 cSt at a temperature of 100° C. and a base oil yield of 16.0 wt %.

It is understood from the obtained results that the hydroisomerization catalyst according to the present invention can increase the isomer yield in comparison with a conventional catalytic dewaxing catalyst although the hydrocarbon oil is dewaxed under the condition that the normal paraffin conversion is increased. It can be observed that, according to the hydroisomerization catalyst of the present invention, it is possible to obtain the isomers with a high yield even in a case where the normal paraffin conversion is 100% and to sufficiently suppress the lightening of the reaction product. Therefore, according to the base oil manufacturing method of the present invention using the hydroisomerization catalyst of present invention, it is possible to obtain a high quality lube-oil base oil with a high yield.

In addition, according to the hydroisomerization catalyst of the present invention, it is possible to sufficiently increase an amount of iso-paraffin composition in the reaction product having 15 or more carbon atoms obtained by dewaxing the wax. The cracking product can be used as a gas oil base oil having a good cold flow property. Therefore, according to the base oil manufacturing method of the present invention using the hydroisomerization catalyst of the present invention, it is possible to obtain a gas oil base oil having a good cold flow property with a high yield.

According to the present invention, it is possible to implement a hydroisomerization catalyst capable of having a high isomerization activity as well as a low cracking activity with a high level in comparison with a conventional catalyst and, particularly, to implement a hydroisomerization catalyst capable of having such properties in a region where a normal paraffin conversion is high. In addition, according to the present invention, it is possible to implement a hydroisomerization catalyst capable of giving a large amount of multibranched and isomers having branch chains in an inner position of the main chain. The isomers can more efficiently improve a cold flow property of a lube-oil base oil or a gas oil base oil. In addition, according to the present invention, it is possible to implement a hydrocarbon oil dewaxing method and a base oil manufacturing method capable of obtaining a lube-oil base oil and/or a fuel base oil having a good cold flow property by using the hydroisomerization catalyst.

INDUSTRIAL APPLICABILITY

According to the present invention, it is possible to provide a hydroisomerization catalyst capable of obtaining a hydrocarbon oil suitable for a lube-oil base oil and a hydrocarbon oil suitable of a fuel base oil from a hydrocarbon oil containing normal paraffins with a high yield and having a sufficiently high isomerization activity and a sufficiently suppressed cracking activity. In addition, according to the present invention, it is possible to provide a hydrocarbon oil dewaxing method, a base oil manufacturing method, and a lube-oil base oil manufacturing method capable of obtaining a lube-oil base oil and/or a fuel base oil having a good cold flow property with a high yield.

The invention claimed is:

1. A hydroisomerization catalyst, which is obtained by calcining a catalyst composite including an ion-exchanged molecular sieve or a calcined material thereof, which is obtained by performing ion exchange of a molecular sieve containing an organic template in a solution containing a cation species and using water as a main solvent and at least one metal which is selected from a group consisting of metals belonging to Groups 8-10 of the Periodic Table of the Elements, molybdenum, and tungsten supported on the ion-exchanged molecular sieve or a calcined material thereof.

2. The hydroisomerization catalyst according to claim 1, wherein the molecular sieve containing the organic template is a zeolite having a pore structure having a 10-membered ring or an 8-membered ring.

3. The hydroisomerization catalyst according to claim 2, wherein the zeolite has a one-dimensional pore structure having a 10-membered ring.

4. The hydroisomerization catalyst according to claim 3, wherein the zeolite is at least one crystalline aluminosilicate selected from a group consisting of ZSM-22, ZSM-23, and ZSM-48.

5. The hydroisomerization catalyst according to claim 4, wherein a molar ratio [Si]/[Al] of silicon to aluminum atoms in the crystalline aluminosilicate is in a range of 10 to 400.

6. The hydroisomerization catalyst according to claim 1,
wherein the molecular sieve containing the organic template is ZSM-22, and
wherein a constraint index defined as follows is in a range of 7 to 12:
constraint index: a molar ratio of 2-methylnonane to 5-methylnonane generated when an iso-decane yield is 5 wt % in a reaction of contacting a normal decane to the hydroisomerization catalyst to be converted into iso-decanes in the presence of hydrogen.

7. The hydroisomerization catalyst according to claim 1,
wherein the molecular sieve containing the organic template is ZSM-23, and
wherein a constraint index defined as follows is in a range of 3.0 to 4.0:
constraint index: a molar ratio of 2-methylnonane to 5-methylnonane generated when an iso-decane yield is 5 wt % in a reaction of contacting a normal decane to the hydroisomerization catalyst to be converted into iso-decanes in the presence of hydrogen.

8. The hydroisomerization catalyst according to claim 1,
wherein the molecular sieve containing the organic template is ZSM-48, and
wherein a constraint index defined as follows is in a range of 1.1 to 5.1:
constraint index: a molar ratio of 2-methylnonane to 5-methylnonane generated when an iso-decane yield is 5 wt % in a reaction of contacting a normal decane to the hydroisomerization catalyst to be converted into iso-decanes in the presence of hydrogen.

9. The hydroisomerization catalyst according to claim 1, wherein the organic template is an amine derivative.

10. The hydroisomerization catalyst according to claim 1, wherein the organic template is one selected from a group consisting of an alkyl amine, an alkyl diamine, an alkyl triamine, an alkyl tetramine, a pyrrolidine, a piperazine, an amino piperazine, an alkyl pentamine, an alkyl hexamine, and derivatives thereof.

11. The hydroisomerization catalyst according to claim 1, wherein the ion-exchanged molecular sieve is obtained by performing ion exchange of the molecular sieve containing the organic template in the presence of an ammonium ion or a proton.

12. The hydroisomerization catalyst according to claim 1, wherein the ion-exchanged molecular sieve is obtained by performing ion exchange of the molecular sieve containing the organic template through a replacement of the solution with a fresh solution one time or two or more times.

13. The hydroisomerization catalyst according to claim 1, wherein the catalyst composite contains platinum and/or palladium supported on the ion-exchanged molecular sieve or a calcined material thereof.

14. The hydroisomerization catalyst according to claim 1, wherein the catalyst is obtained by performing calcination of the catalyst composite in the presence of molecular oxygen and, after that, reduction in the presence of molecular hydrogen.

15. The hydroisomerization catalyst according to claim 1, wherein the catalyst composite contains 1 part by weight to 90 parts by weight of the ion exchanged molecular sieve or a calcined material thereof and 99 parts by weight to 10 parts by weight of a porous oxide which is at least one selected from a group consisting of alumina, silica, titania, boria, magnesia, and zirconia.

16. The hydroisomerization catalyst according to claim 1, wherein the catalyst composite contains a carrier obtained by calcining a carrier composite containing 1 part by weight to 90 parts by weight of the ion exchange molecular sieve and 99 parts by weight to 10 parts by weight of a porous oxide which is at least one selected from a group consisting of alumina, silica, titania, boria, magnesia, and zirconia, and the metal supported on the carrier.

17. A hydrocarbon oil dewaxing method comprising a process of converting a part or the entire of the normal paraffins into iso-paraffins by contacting a hydrocarbon oil containing normal paraffins and the hydroisomerization catalyst according to claim 1 in the presence of hydrogen.

18. The hydrocarbon oil dewaxing method according to claim 17, wherein the hydrocarbon oil is at least one selected from a group consisting of a slack wax, a de-oiled wax, a paraffin wax, a micro-crystalline wax, petrolatum, and a Fischer-Tropsch synthetic wax.

19. A base oil manufacturing method of obtaining a lube-oil base oil and/or a fuel base oil by performing a process of contacting a hydrocarbon oil containing normal paraffins and the hydroisomerization catalyst according to claim 1 in the presence of hydrogen.

20. The base oil manufacturing method according to claim 19, wherein the hydrocarbon oil is at least one selected from a group consisting of a slack wax, a de-oiled wax, a paraffin wax, a micro-crystalline wax, petrolatum, and a Fischer-Tropsch synthetic wax.

21. An lube-oil base oil manufacturing method of obtaining a lube-oil base oil by performing a process of contacting a hydrocarbon oil containing normal paraffins having 10 or more carbon atoms and the hydroisomerization catalyst according to claim 1 in the presence of hydrogen under the condition that a normal paraffin conversion defined by the following Equation I is substantially 100 wt %:

[Equation I]

Normal paraffin conversion (%)=[1−(Total Weight of Cn or more normal paraffins Contained in After-Contacting hydrocarbon oil)/(Total Weight of Cn or more normal paraffins Contained in Before-Contacting hydrocarbon oil)]×100    (I)

wherein, in Equation I, Cn denotes a minimum number of carbon atoms in the normal paraffins having 10 or more carbon atoms included in a before-contacting hydrocarbon oil.

22. The lube-oil base oil manufacturing method according to claim 21, wherein the hydrocarbon oil is one selected from a group consisting of a slack wax, a de-oiled wax, a paraffin wax, a micro-crystalline wax, petrolatum, and a Fischer-Tropsch synthetic wax.

* * * * *